US012453350B2

(12) United States Patent
Carroll et al.

(10) Patent No.: US 12,453,350 B2
(45) Date of Patent: Oct. 28, 2025

(54) **METHODS FOR THE CONTROL OF *Poa annua* IN WARM SEASON TURFGRASS USING THIENCARBAZONE-METHYL**

(71) Applicant: Discovery Purchaser Corporation, Wilmington, DE (US)

(72) Inventors: Devon Carroll, Cary, NC (US); Patrick Maxwell, Raleigh, NC (US)

(73) Assignee: Discovery Purchaser Corporation, Wilmington, DE (US)

( * ) Notice: Subject to any disclaimer, the term of this patent is extended or adjusted under 35 U.S.C. 154(b) by 0 days.

(21) Appl. No.: 18/900,318

(22) Filed: Sep. 27, 2024

(65) Prior Publication Data
US 2025/0268262 A1    Aug. 28, 2025

Related U.S. Application Data

(63) Continuation of application No. 18/587,616, filed on Feb. 26, 2024.

(51) Int. Cl.
| | | |
|---|---|---|
| *A01N 47/38* | (2006.01) | |
| *A01N 37/40* | (2006.01) | |
| *A01N 47/36* | (2006.01) | |
| *A01P 13/00* | (2006.01) | |

(52) U.S. Cl.
CPC ............ *A01N 47/38* (2013.01); *A01N 37/40* (2013.01); *A01N 47/36* (2013.01); *A01P 13/00* (2021.08)

(58) Field of Classification Search
CPC ........ A01N 47/38; A01N 37/40; A01N 47/36; A01P 13/00
See application file for complete search history.

(56) References Cited

PUBLICATIONS

Celsius WG Herbicide Label, 2021, Bayer, United States Environmental Protection Agency, 18 pages. (Year: 2021).*
Piepho, Hans-Peter et al., Efficacy assessment in crop protection: a tutorial on the use of Abbott's formula, 2024, Journal of Plant Diseases and Protection, 20 pages. (Year: 2024).*
Taylor, Dallas R., et al., Modeling seasonal emergence of Poa annua in urban greenspace, Scientific Reports, Sep. 23, 2021, pp. 1-6.
Bayer Environmental Sciences, Tribute Total label, https://www.cdms.net/ldat/IdANG009.pdf, no date provided Oct. 31, 2024.
Bayer Environmental Sciences, FIFRA2(ee) Recommendation, Jul. 12, 2023, https://www.cdms.net/ldat/ld9HO002.pdf.
Assignment Agreement from Devon Carroll and Patrick Maxwell to Discovery Purchaser Corporation signed Mar. 13, 2024.
"Bayer completes sale of its Environmental Science Professional business to Cinven." Oct. 5, 2022. Web Address: https://www.bayer.com/media/en-us/bayer-completes-sale-of-its-environmental-science-professional-business-to-cinven/.
Celsius WG Herbicide Label, Environmental Science U.S., LLC, United States Environmental Protection Agency, Web Address: https://ordspub.epa.gov/ords/pesticides/f?p=PPLS:8:9296865855389::No. P8 PUID, P8_RINUM:497044,432-1507, no date attached Mar. 21, 2025.

* cited by examiner

*Primary Examiner* — Ali Soroush
*Assistant Examiner* — Andriae M Holt
(74) *Attorney, Agent, or Firm* — E. Eric Mills; Nicholas P. Stadnyk; Maynard Nexsen PC

(57) ABSTRACT

Methods for controlling and/or suppressing *Poa annua* (annual bluegrass) in a stand of warm season turfgrass are provided. In certain aspects, the methods may include contacting a stand of warm season turfgrass comprising *Poa annua* with an herbicidally effective amount of thiencarbazone-methyl when the *Poa annua* is in an early post-emergence growth state or during an early post-emergence period of time.

20 Claims, 13 Drawing Sheets

METHODS FOR THE CONTROL OF *Poa annua* IN WARM SEASON TURFGRASS USING THIENCARBAZONE-METHYL

TECHNICAL FIELD

The present disclosure generally relates to methods for controlling or suppressing *Poa annua* (annual bluegrass) using thiencarbazone-methyl, particularly for the treatment of warm season turfgrasses infested with *Poa annua*, or methods for controlling or suppressing *Poa annua* in warm season turfgrass stands and growing environments in which warm season turfgrass stands are grown or cultivated.

BACKGROUND

*Poa annua* L., also referred to as "annual bluegrass," is the most troublesome weed in turfgrass systems according to the Weed Science Society of America and is regularly described by herbicide users in turfgrass systems as their primary weed challenge. Although there are numerous products on the market that are labeled for control of *Poa annua* in turfgrass, turfgrass managers are constrained by price, turfgrass tolerance, and rapidly increasing herbicide resistance. For example, there are documented cases of *Poa annua* resistance against ten different herbicide mode of action groups. Therefore, the applicant has recognized that additional strategies and methods for the control or suppression of *Poa annua* in turfgrass systems are needed.

SUMMARY

To address these shortcomings, Applicant has discovered new methods for controlling the difficult to control weed *Poa annua* in warm season turfgrass systems. In particular, the presently disclosed methods involve the post-emergent application of the herbicide thiencarbazone-methyl, or herbicidal compositions containing thiencarbazone-methyl, during a particular confined portion of the *Poa annua* growth cycle or period of time following the emergence of *Poa annua*. It has previously been thought that the post-emergent application of thiencarbazone-methyl, without being combined with another herbicide or synergistic adjuvant, is commercially ineffective against *Poa annua* (e.g., resulting in less than an 80% reduction in *Poa annua* population), and/or is an inefficient control agent against *Poa annua*, requiring higher thiencarbazone-methyl concentrations than are commercially acceptable or that are safe for the turfgrass itself. The Applicant has unexpectedly discovered that thiencarbazone-methyl may effectively and/or efficiently control *Poa annua* in warm season turfgrass systems when contact with *Poa annua* is confined to an early post-emergence period or growth state which may be defined as either the period of time in which the *Poa annua* plants are characterized as having two or fewer tillers or the period of time defined by a set of environmental conditions discovered to determine susceptibility of the *Poa annua* plants to the application of thiencarbazone-methyl. Importantly, it has been surprisingly discovered by the Applicant that when *Poa annua* is contacted with thiencarbazone-methyl according to the presently disclosed methods, a single application of thiencarbazone-methyl may be effective for controlling *Poa annua*, even in the absence of any other actives or synergistic adjuvants. In particular, treatment of warm season turfgrass with a single application of thiencarbazone-methyl, when applied according to the presently disclosed methods, results in a 80% or greater reduction in *Poa annua* population for at least 120 days following application.

The Applicant has further discovered that the earliest emergence of *Poa annua*, as well as the time period during which *Poa annua* is susceptible to the application of thiencarbazone-methyl, for a particular stand of turfgrass in a particular geographic location and for a particular season or year, may be predicted based on the monitoring of seven day average soil temperatures or seven day average air temperatures, even before the emergence of *Poa annua* is detectable by visual inspection of the turfgrass canopy in the turfgrass stand. This method is particularly important for the control of *Poa annua* in turfgrass systems because *Poa annua* may not be observed or be visible in the turfgrass for several weeks after it has emerged or germinated and the timing of emergence of *Poa annua* may vary significantly from location to location or from year to year in a particular location or stand of turfgrass. Additionally, in at least some instances, it may be too late to effectively control *Poa annua* in a stand of turfgrass by the application of thiencarbazone-methyl if the application of thiencarbazone-methyl is not applied until after one or more *Poa annua* plants is visible above the turfgrass canopy in the stand of turfgrass.

The present disclosure provides methods for controlling or suppressing *Poa annua*, also known as annual bluegrass, in one or more stands of warm season turfgrass. In certain embodiments, the method may include contacting one or more stands of warm season turfgrass, that contains or is otherwise infested with *Poa annua*, with an herbicidally effective amount of thiencarbazone-methyl while the *Poa annua* is in an early post-emergence growth state or during an early post-emergence period of time. In certain embodiments, the contacting of the stand of warm season turfgrass, and/or the *Poa annua* therein, may be restricted to only the early post-emergent time period or when the *Poa annua* is in an early post-emergence growth state.

In certain embodiments, the early post-emergence growth period or state may be a time point or period of time for thiencarbazone-methyl application that is defined by the soil temperature below the stand of warm season turfgrass. In such instances, the contacting of the *Poa annua* with thiencarbazone-methyl may occur when the soil temperature below the warm season turfgrass is less than about 18.9 degrees Celsius (66 degrees Fahrenheit). In certain instances, the *Poa annua* may be contacted with thiencarbazone-methyl within about ten (10) weeks of when the soil temperature first falls below about 18.9 degrees Celsius (66 degrees Fahrenheit) in the autumn or following the summer solstice. According to certain aspects of the present disclosure, the contacting may occur when the average daily soil temperature below the warm season turfgrass is below about 18.9 degrees Celsius (66 degrees Fahrenheit) for the preceding week prior to contacting. In such instances, the average daily soil temperature may be calculated on a weekly basis.

In other instances, the contacting of the *Poa annua* with thiencarbazone-methyl may occur when the soil temperature below the warm season turfgrass is from about 10 degrees Celsius (50 degrees Fahrenheit) to about 18.9 degrees Celsius (66 degrees Fahrenheit). In still other instances, the contacting may occur when the average daily soil temperature below the warm season turfgrass comprising *Poa annua* is from about 10 degrees Celsius (50 degrees Fahrenheit) to about 18.9 degrees Celsius (66 degrees Fahrenheit) for preceding week prior to contacting. In such instances, the average daily soil temperature may be calculated on a weekly basis.

According to some aspects, the contacting may occur during the period of time beginning when the soil temperature below the warm season turfgrass first reaches a temperature below about 18.9 degrees Celsius (66 degrees Fahrenheit) in the autumn or following the summer solstice and ending ten (10) weeks later. In other instances, the contacting may occur during the period of time beginning one (1) week and ending ten (10) weeks after the soil temperature below the warm season turfgrass first reaches a temperature below about 18.9 degrees Celsius (66 degrees Fahrenheit) in the autumn or following the summer solstice. In other embodiments, the contacting may occur during the period of time beginning two (2) weeks and ending ten (10) weeks after the about 18.9 degrees Celsius (66 degrees Fahrenheit) in the autumn or following the summer solstice. In still other embodiments, the contacting may occur during the period of time beginning two (2) weeks and ending eight (8) weeks after the average daily soil temperature below the warm season turfgrass first reaches a temperature below about 18.9 degrees Celsius (66 degrees Fahrenheit) in the autumn or following the summer solstice. In still other embodiments, the contacting may occur during the period of time beginning two (2) weeks and ending five (5) weeks after the average daily soil temperature below the warm season turfgrass first reaches a temperature below about 18.9 degrees Celsius (66 degrees Fahrenheit) in the autumn or following the summer solstice. In such instances, the average daily soil temperature may be calculated on a weekly basis.

In another aspect, the early post-emergence growth period or state may be a time point or period of time for thiencarbazone-methyl application that is defined by the air temperature surrounding the stand of turfgrass or the meteorological temperature measured or predicted for the geographical area in which the stand of warm season turfgrass is located. In such instances, the contacting of the *Poa annua* with thiencarbazone-methyl may occur when the air temperature surrounding the warm season turfgrass is less than about 18.5 degrees Celsius (65 degrees Fahrenheit). In certain instances, the *Poa annua* may be contacted with thiencarbazone-methyl within about ten (10) weeks of when the air temperature first falls below about 18.4 degrees Celsius (65 degrees Fahrenheit) in the autumn or following the summer solstice. According to certain aspects of the present disclosure, the contacting may occur when the average daily air temperature below the warm season turfgrass is below about 18.4 degrees Celsius (65 degrees Fahrenheit) for the preceding week prior to contacting. In such instances, the average daily air temperature may be calculated on a weekly basis.

In other instances, the contacting of the *Poa annua* with thiencarbazone-methyl may occur when the air temperature surrounding the warm season turfgrass is from about 0 degrees Celsius (32 degrees Fahrenheit) to about 18.4 degrees Celsius (65 degrees Fahrenheit). In still other instances, the contacting may occur when the average daily air temperature surrounding the warm season turfgrass comprising *Poa annua* is from about 0 degrees Celsius (32 degrees Fahrenheit) to about 18.4 degrees Celsius (65 degrees Fahrenheit) for the preceding week prior to contacting. In such instances, the average daily air temperature may be calculated on a weekly basis.

According to certain aspects, the contacting may occur during the period of time beginning when the air temperature surrounding the warm season turfgrass first reaches a temperature less than about 18.4 degrees Celsius (65 degrees Fahrenheit) in the autumn or following the summer solstice and ending 10 weeks later. In other instances, the contacting may occur during the period of time beginning one (1) week and ending ten (10) weeks after the air temperature surrounding the warm season turfgrass first reaches a temperature less than about 18.4 degrees Celsius (65 degrees Fahrenheit) in the autumn or following the summer solstice. In other embodiments, the contacting may occur during the period of time beginning two (2) weeks and ending ten (10) weeks after the average daily air temperature surrounding the warm season turfgrass first reaches a temperature less than about 18.4 degrees Celsius (65 degrees Fahrenheit) in the autumn or following the summer solstice. In other instances, the contacting may occur during the period of time beginning two (2) weeks and ending eight (8) weeks after the air temperature surrounding the warm season turfgrass first reaches a temperature less than about 18.4 degrees Celsius (65 degrees Fahrenheit) in the autumn or following the summer solstice. In other embodiments, the contacting may occur during the period of time beginning two (2) weeks and ending five (5) weeks after the average daily air temperature surrounding the warm season turfgrass first reaches a temperature less than about 18.4 degrees Celsius (65 degrees Fahrenheit) in the autumn or following the summer solstice. In such instances, the average daily air temperature may be calculated on a weekly basis.

In certain embodiments, the early post-emergence growth period or state may be a time point or period of time for thiencarbazone-methyl application that is defined by the state of the *Poa annua* plants themselves. In such instances, the contacting may occur during, or alternatively be restricted to, the period of time in which the *Poa annua* plants are characterized as having two or fewer tillers. In certain embodiments, the early post-emergence growth state may be the period of time in which substantially all of the *Poa annua* plants in the stand of warm season turfgrass are characterized as having two or fewer tillers. In still other embodiments, the early post-emergence growth state may be the period of time in which the majority or at least 80% of the *Poa annua* plants in the stand of warm season turfgrass are characterized as having two or fewer tillers.

In still other embodiments, the early post-emergence growth state may be the period of time in which the *Poa annua* plants lack inflorescences or are characterized as being in a pre-inflorescence growth stage. In other embodiments, the early post-emergence growth state may be the period of time in which the majority or at least 80% of the *Poa annua* plants lack inflorescences or are characterized as being in a pre-inflorescence growth stage. In still other aspects of the present disclosure, the early post-emergence growth state may be the period of time in which substantially all of the *Poa annua* plants lack inflorescences or are characterized as being in a pre-inflorescence growth stage.

According to other aspects of the present disclosure, the early post-emergence growth state may be a time point or period of time for thiencarbazone-methyl application that is defined by a period of time after which the emergence of the *Poa annua* plants is first detected. For example, the contacting may occur during, or be restricted to, the period of time beginning when the new emergence of one or more *Poa annua* plants is first detected in the stand of warm season turfgrass during the autumn or following the summer solstice and ending ten (10) weeks later.

The *Poa annua* or stand of warm season turfgrass suffering from an infestation of *Poa annua* may be contacted with thiencarbazone-methyl in any herbicidally effective manner. For example, in certain embodiments, contacting the *Poa annua* or the stand of warm season turfgrass with an herbicidally effective amount of thiencarbazone-methyl may include, applying or causing the application of one or more compositions comprising an herbicidally effective amount of thiencarbazone-methyl to the stand of warm season turfgrass such that *Poa annua* is contacted by an herbicidally effective amount of thiencarbazone-methyl. In certain aspects, the method may include spraying an herbicidally effective amount of an herbicidal composition or a liquid solution comprising thiencarbazone-methyl onto the *Poa annua* or the stand of warm season turfgrass such that the *Poa annua* is contacted by the herbicidal composition or liquid formulation. For example, the herbicidal composition or liquid solution may be a water-dispersible granule (WG) formulation, suspension concentrate (SC) formulation, or any other herbicidally-effective formulation comprising thiencarbazone-methyl. The presently disclosed methods may also include treating a stand of warm season turfgrass infested with *Poa annua* or treating an infestation of *Poa annua* in a stand of warm season turfgrass by contacting the stand of warm season turfgrass with an herbicidally effective amount of thiencarbazone-methyl while the *Poa annua* is in an early post-emergence growth state. In such instances, the method may also include applying an herbicidal composition or a liquid solution comprising thiencarbazone-methyl directly to the *Poa annua* in the stand of warm season turfgrass as a spot spray.

In at least certain aspects, the contacting may occur in the absence of contacting the stand of warm season turfgrass comprising *Poa annua* with any other herbicidal active ingredient. In other aspects, the contacting may occur in the absence of contacting the stand of warm season turfgrass comprising *Poa annua* with any other herbicidal active ingredient effective for the control or suppression of *Poa annua*. In certain other aspects, no other herbicidal active ingredients effective for the control or suppression of *Poa annua* are contacted with the stand of warm season turfgrass comprising *Poa annua* when *Poa annua* is in an early post-emergence growth state. In certain aspects, the contacting may be effective to control or suppress *Poa annua* in the absence of the contacting of the stand of warm season turfgrass comprising *Poa annua* with any other herbicidal active ingredients. In at least certain embodiments, the contacting may be effective to suppress or control *Poa annua* in the stand of turfgrass when thiencarbazone-methyl is applied in a single application of from about 15 grams (g) thiencarbazone-methyl active ingredient (a.i.) to about 30 g a.i. per hectare of turfgrass. The contacting of the stand of warm season turfgrass with an herbicidally effective amount of thiencarbazone-methyl may result in an 80% or greater reduction in the population of *Poa annua* in the stand of warm season turfgrass when applied to the presently disclosed methods.

Still other aspects and advantages of these exemplary embodiments and other embodiments, are discussed in detail herein. Moreover, it is to be understood that both the foregoing information and the following detailed description provide merely illustrative examples of various aspects and embodiments and are intended to provide an overview or framework for understanding the nature and character of the claimed aspects and embodiments. Accordingly, these and other advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

DETAILED DESCRIPTION

Figure 1:
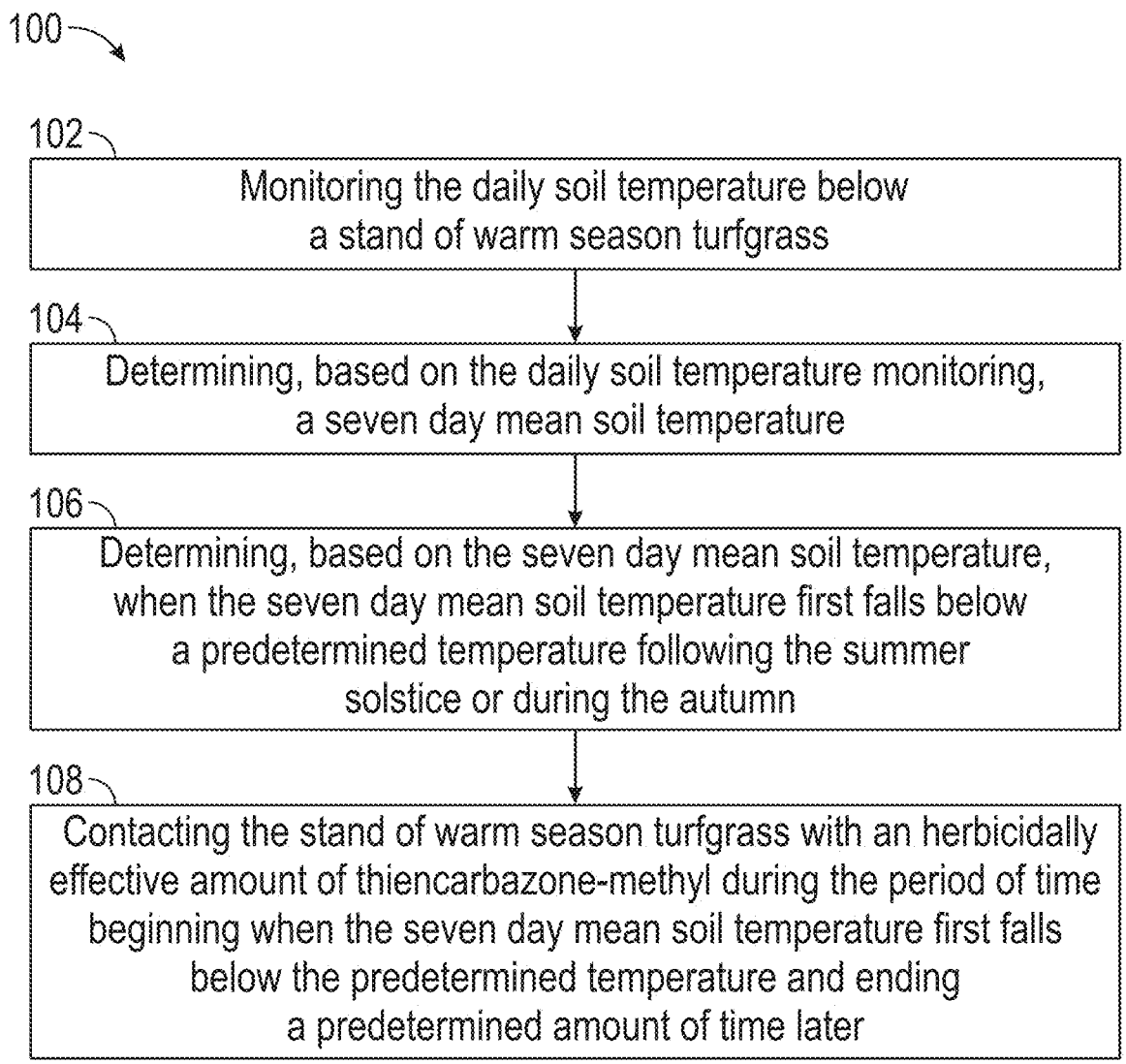
FIG. 1 is a diagrammatic representation of an example method for controlling *Poa annua* in a stand of warm season turfgrass that includes, among other features, daily soil temperature monitoring, according to an exemplary embodiment of the present disclosure.

The present disclosure describes various embodiments related to methods and compositions for controlling hard to control undesirable *Poa annua*, also known as annual bluegrass, in warm season turfgrass systems. Further embodiments may be described and disclosed.

In the following description, numerous details are set forth in order to provide a thorough understanding of the various embodiments. In other instances, well-known processes, devices, and systems may not have been described in particular detail in order not to unnecessarily obscure the various embodiments. Additionally, illustrations of the various embodiments may omit certain features or details in order to not obscure the various embodiments.

The description may use the phrases "in some embodiments," "in various embodiments," "in an embodiment," or "in embodiments," which may each refer to one or more of the same or different embodiments. Furthermore, the terms "comprising," "including," "having," and the like, as used with respect to embodiments of the present disclosure, are synonymous.

The term "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "reducing," "reduced," or any variation thereof, when used in the claims and/or the specification includes any measurable decrease or complete inhibition to achieve a desired result.

The use of the words "a" or "an" when used in conjunction with any of the terms "comprising," "including," "containing," or "having," in the claims or the specification may mean "one," but it is also consistent with the meaning of "one or more," "at least one," and "one or more than one." The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

When ranges are disclosed herein, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, reference to values stated in ranges includes each and every value within that range, even though not explicitly recited. Thus, every point or individual value may serve as its own lower or upper limit combined with any other point or individual value or any other lower or upper limit, to recite a range not explicitly recited.

Disclosed herein are methods for controlling hard to control *Poa annua*, also known as annual bluegrass, in warm season turfgrass systems. When applied according to the presently disclosed methods, the applicant has surprisingly discovered that thiencarbazone-methyl may effectively reduce the *Poa annua* population in warm season turfgrass by at least 80%. In at least some embodiments, the presently disclosed methods may be operable to achieve an 80% or greater reduction in *Poa annua* population following a single application of an herbicidal composition thiencarbazone-methyl to a stand of warm season turfgrass. In other embodiments, the presently disclosed methods may be operable to achieve an 80% or greater reduction in *Poa annua* population when application of thiencarbazone-methyl to a stand of warm season turfgrass is restricted to one application per year or one application per growing season. Further, this control efficacy against *Poa annua* may be achieved in turfgrass systems at thiencarbazone-methyl application rates that do not significantly impact the growth of the desirable turfgrass.

The presently disclosed methods involve the use of an herbicidally effective amount of the herbicide thiencarbazone-methyl. Thiencarbazone-methyl is also known as methyl 4-[(3-methoxy-4-methyl-5-oxo-1,2,4-triazole-1-carbonyl) sulfamoyl]-5-methylthiophene-3-carboxylate or by CAS number 317815-83-1, and may be characterized by the following chemical structure:

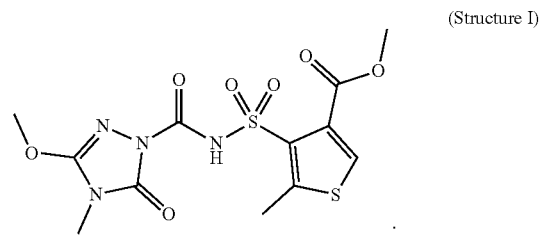

(Structure I)

The present disclosure provides methods for controlling the difficult to control weed *Poa annua* in warm season turfgrass systems. In particular, the presently disclosed methods involve the post-emergent application of the herbicide thiencarbazone-methyl, or herbicidal compositions containing thiencarbazone-methyl, during a particular confined portion of the *Poa annua* growth cycle or period of time following the emergence of *Poa annua*. The Applicant has unexpectedly discovered that thiencarbazone-methyl may effectively and/or efficiently control *Poa annua* in warm season turfgrass systems when contact with *Poa annua* is confined to an early post-emergence period or growth state which may be defined as either the period of time in which the *Poa annua* plants are characterized as having two or fewer tillers or the period of time defined by a set of environmental conditions discovered to determine susceptibility of the *Poa annua* plants to the application of thiencarbazone-methyl. It has further been surprisingly discovered by the Applicant that when *Poa annua* is contacted with thiencarbazone-methyl according to the presently disclosed methods, a single application of thiencarbazone-methyl may be effective for controlling *Poa annua*, even in the absence of any other actives or synergistic adjuvants. In particular, treatment of warm season turfgrass with a single application of thiencarbazone-methyl, when applied according to the presently disclosed methods, results in an 80% or greater reduction in *Poa annua* population for at least 120 days following application.

Methods for controlling or suppressing *Poa annua*, also known as annual bluegrass, in one or more stands of warm season turfgrass are provided. In particular, the method may include contacting one or more stands of warm season turfgrass, that contains or is otherwise infested with *Poa annua*, with an herbicidally effective amount of thiencarbazone-methyl while the *Poa annua* is in an early post-emergence growth period or state. In certain embodiments, the contacting of the stand of warm season turfgrass, and/or the *Poa annua* therein, may be restricted to only the time period when the *Poa annua* is in an early post-emergence growth period or state.

In some instances, the early post-emergence growth period or state may be a time point or period of time for thiencarbazone-methyl application that is defined by the soil temperature below the stand of warm season turfgrass. In such instances, the contacting of the *Poa annua* with thiencarbazone-methyl may occur when the soil temperature below the warm season turfgrass is less than about 18.9 degrees Celsius (66 degrees Fahrenheit), or less than about 18.4 degrees Celsius (65 degrees Fahrenheit), or less than about 15.6 degrees Celsius (60 degrees Fahrenheit).

In certain instances, the *Poa annua* may be contacted with thiencarbazone-methyl during the time period beginning when the soil temperature first falls below about 18.9 degrees Celsius (66 degrees Fahrenheit) in the autumn or following the summer solstice and ending ten (10) weeks later. In other instances, the *Poa annua* may be contacted with thiencarbazone-methyl during the time period beginning when the soil temperature first falls below about 18.4 degrees Celsius (65 degrees Fahrenheit) in the autumn or following the summer solstice and ending ten (10) weeks later. In still other cases, the *Poa annua* may be contacted with thiencarbazone-methyl during the time period beginning when the soil temperature first falls below about 15.6 degrees Celsius (60 degrees Fahrenheit) in the autumn or following the summer solstice and ending ten (10) weeks later.

According to certain aspects of the present disclosure, the contacting may occur when the average daily soil temperature below the warm season turfgrass is below about 18.9 degrees Celsius (66 degrees Fahrenheit) for the preceding week prior to contacting. In other aspects, the contacting may occur when the average daily soil temperature below the warm season turfgrass is below about 18.4 degrees Celsius (65 degrees Fahrenheit) for the preceding week prior to contacting. In still other aspects, the contacting may occur when the average daily soil temperature below the warm season turfgrass is below about 15.6 degrees Celsius (60 degrees Fahrenheit) for the preceding week prior to contacting. In all such aspects, the average daily soil temperature may be calculated on a weekly basis and the contacting may occur during the autumn.

In other instances, the contacting of the *Poa annua* with thiencarbazone-methyl may occur when the soil temperature below the warm season turfgrass is from about 10 degrees Celsius (50 degrees Fahrenheit) to about 18.9 degrees Celsius (66 degrees Fahrenheit), or from about 10 degrees Celsius (50 degrees Fahrenheit) to about 18.4 degrees Celsius (65 degrees Fahrenheit), or from about 10 degrees Celsius (50 degrees Fahrenheit) to about 15.6 degrees Celsius (60 degrees Fahrenheit), or from about 10 degrees Celsius (50 degrees Fahrenheit) to about 14.5 degrees Celsius (58 degrees Fahrenheit). In all such instances, the contacting may occur during the autumn.

In some instances, the contacting may occur when the average daily soil temperature below the warm season turfgrass comprising *Poa annua* is from about 10 degrees Celsius (50 degrees Fahrenheit) to about 18.9 degrees Celsius (66 degrees Fahrenheit) for the preceding week prior to contacting. In other instances, the contacting may occur when the average daily soil temperature below the warm season turfgrass comprising *Poa annua* is from about 10 degrees Celsius (50 degrees Fahrenheit) to about 18.4 degrees Celsius (65 degrees Fahrenheit) for the preceding week prior to contacting. In still other instances, the contacting may occur when the average daily soil temperature below the warm season turfgrass comprising *Poa annua* is from about 10 degrees Celsius (50 degrees Fahrenheit) to about 15.6 degrees Celsius (60 degrees Fahrenheit) for the preceding week prior to contacting. In yet other instances, the contacting may occur when the average daily soil temperature below the warm season turfgrass comprising *Poa annua* is from about 10 degrees Celsius (50 degrees Fahrenheit) to about 14.5 degrees Celsius (58 degrees Fahrenheit) for the preceding week prior to contacting. In still other instances, the contacting may occur when the average daily soil temperature below the warm season turfgrass comprising *Poa annua* is from about 10 degrees Celsius (50 degrees Fahrenheit) to about 12.8 degrees Celsius (55 degrees Fahrenheit) for the preceding week prior to contacting. In all such instances, the average daily soil temperature may be calculated on a weekly basis and the contacting may occur during the autumn.

In some aspects, the contacting may occur during the period of time beginning when the soil temperature below the warm season turfgrass first reaches a temperature below about 18.9 degrees Celsius (66 degrees Fahrenheit) in the autumn or following the summer solstice, and ending ten (10) weeks later. In some aspects, the contacting may occur during the period of time beginning when the soil temperature below the warm season turfgrass first reaches a temperature below about 18.9 degrees Celsius (66 degrees Fahrenheit) in the autumn or following the summer solstice, and ending eight (8) weeks later. In some aspects, the contacting may occur during the period of time beginning when the soil temperature below the warm season turfgrass first reaches a temperature below about 18.9 degrees Celsius (66 degrees Fahrenheit) in the autumn or following the summer solstice, and ending five (5) weeks later. In some aspects, the contacting may occur during the period of time beginning when the soil temperature below the warm season turfgrass first reaches a temperature below about 18.9 degrees Celsius (66 degrees Fahrenheit) in the autumn or following the summer solstice, and ending two (2) weeks later. In other aspects, the contacting may occur during the period of time beginning one (1) week and ending ten (10) weeks after the soil temperature below the warm season turfgrass first reaches a temperature below about 18.9 degrees Celsius (66 degrees Fahrenheit) in the autumn or following the summer solstice. In still other aspects, the contacting may occur during the period of time beginning two (2) weeks and ending ten (10) weeks after the soil temperature below the warm season turfgrass first reaches a temperature below about 18.9 degrees Celsius (66 degrees Fahrenheit) in the autumn or following the summer solstice. In yet other aspects, the contacting may occur during the period of time beginning two (2) weeks and ending five (5) weeks after the soil temperature below the warm season turfgrass first reaches a temperature below about 18.9 degrees Celsius (66 degrees Fahrenheit) in the autumn or following the summer solstice. According to some other aspects, the contacting may occur during the period of time beginning two (2) weeks and ending eight (8) weeks after the soil temperature below the warm season turfgrass first reaches a temperature below about 18.9 degrees Celsius (66 degrees Fahrenheit) in the autumn or following the summer solstice.

In some aspects, the contacting may occur during the period of time beginning when the soil temperature below the warm season turfgrass first reaches a temperature below about 18.4 degrees Celsius (65 degrees Fahrenheit) in the autumn or following the summer solstice, and ending ten (10) weeks later. In some aspects, the contacting may occur during the period of time beginning when the soil temperature below the warm season turfgrass first reaches a temperature below about 18.4 degrees Celsius (65 degrees Fahrenheit) in the autumn or following the summer solstice, and ending eight (8) weeks later. In some aspects, the contacting may occur during the period of time beginning when the soil temperature below the warm season turfgrass first reaches a temperature below about 18.4 degrees Celsius (65 degrees Fahrenheit) in the autumn or following the summer solstice, and ending five (5) weeks later. In some aspects, the contacting may occur during the period of time beginning when the soil temperature below the warm season turfgrass first reaches a temperature below about 18.4 degrees Celsius (65 degrees Fahrenheit) in the autumn or following the summer solstice, and ending two (2) weeks later. In other aspects, the contacting may occur during the period of time beginning one (1) week and ending ten (10) weeks after the soil temperature below the warm season turfgrass first reaches a temperature below about 18.4 degrees Celsius (65 degrees Fahrenheit) in the autumn or following the summer solstice. In still other aspects, the contacting may occur during the period of time beginning two (2) weeks and ending ten (10) weeks after the soil temperature below the warm season turfgrass first reaches a temperature below about 18.4 degrees Celsius (65 degrees Fahrenheit) in the autumn or following the summer solstice. In yet other aspects, the contacting may occur during the period of time beginning two (2) weeks and ending five (5) weeks after the soil temperature below the warm season turfgrass first reaches a temperature below about 18.4 degrees Celsius (65 degrees Fahrenheit) in the autumn or following the summer solstice. According to some other aspects, the contacting may occur during the period of time beginning two (2) weeks and ending eight (8) weeks after the soil temperature below the warm season turfgrass first reaches a temperature below about 18.4 degrees Celsius (65 degrees Fahrenheit) in the autumn or following the summer solstice.

In some aspects, the contacting may occur during the period of time beginning when the soil temperature below the warm season turfgrass first reaches a temperature below about 15.6 degrees Celsius (60 degrees Fahrenheit) in the autumn or following the summer solstice, and ending ten (10) weeks later. In some aspects, the contacting may occur during the period of time beginning when the soil temperature below the warm season turfgrass first reaches a temperature below about 15.6 degrees Celsius (60 degrees Fahrenheit) in the autumn or following the summer solstice, and ending eight (8) weeks later. In some aspects, the contacting may occur during the period of time beginning when the soil temperature below the warm season turfgrass first reaches a temperature below about 15.6 degrees Celsius (60 degrees Fahrenheit) in the autumn or following the summer solstice, and ending five (5) weeks later. In some aspects, the contacting may occur during the period of time beginning when the soil temperature below the warm season turfgrass first reaches a temperature below about 15.6 degrees Celsius (60 degrees Fahrenheit) in the autumn or following the summer solstice, and ending two (2) weeks later. In other aspects, the contacting may occur during the period of time beginning one (1) week and ending ten (10) weeks after the soil temperature below the warm season turfgrass first reaches a temperature below about 15.6 degrees Celsius (60 degrees Fahrenheit) in the autumn or following the summer solstice. In still other aspects, the contacting may occur during the period of time beginning two (2) weeks and ending ten (10) weeks after the soil temperature below the warm season turfgrass first reaches a temperature below about 15.6 degrees Celsius (60 degrees Fahrenheit) in the autumn or following the summer solstice. In yet other aspects, the contacting may occur during the period of time beginning two (2) weeks and ending five (5) weeks after the soil temperature below the warm season turfgrass first reaches a temperature below about 15.6 degrees Celsius (60 degrees Fahrenheit) in the autumn or following the summer solstice. According to some other aspects, the contacting may occur during the period of time beginning two (2) weeks and ending eight (8) weeks after the soil temperature below the warm season turfgrass first reaches a temperature below about 15.6 degrees Celsius (60 degrees Fahrenheit) in the autumn or following the summer solstice.

In some aspects, the contacting may occur during the period of time beginning when the soil temperature below the warm season turfgrass first reaches a temperature below about 14.5 degrees Celsius (58 degrees Fahrenheit) in the autumn or following the summer solstice, and ending ten (10) weeks later. In some aspects, the contacting may occur during the period of time beginning when the soil temperature below the warm season turfgrass first reaches a temperature below about 14.5 degrees Celsius (58 degrees Fahrenheit) in the autumn or following the summer solstice, and ending eight (8) weeks later. In some aspects, the contacting may occur during the period of time beginning when the soil temperature below the warm season turfgrass first reaches a temperature below about 14.5 degrees Celsius (58 degrees Fahrenheit) in the autumn or following the summer solstice, and ending five (5) weeks later. In some aspects, the contacting may occur during the period of time beginning when the soil temperature below the warm season turfgrass first reaches a temperature below about 14.5 degrees Celsius (58 degrees Fahrenheit) in the autumn or following the summer solstice, and ending two (2) weeks later. In other aspects, the contacting may occur during the period of time beginning one (1) week and ending ten (10) weeks after the soil temperature below the warm season turfgrass first reaches a temperature below about 14.5 degrees Celsius (58 degrees Fahrenheit) in the autumn or following the summer solstice. In still other aspects, the contacting may occur during the period of time beginning two (2) weeks and ending ten (10) weeks after the soil temperature below the warm season turfgrass first reaches a temperature below about 14.5 degrees Celsius (58 degrees Fahrenheit) in the autumn or following the summer solstice. In yet other aspects, the contacting may occur during the period of time beginning two (2) weeks and ending five (5) weeks after the soil temperature below the warm season turfgrass first reaches a temperature below about 14.5 degrees Celsius (58 degrees Fahrenheit) in the autumn or following the summer solstice. According to some other aspects, the contacting may occur during the period of time beginning two (2) weeks and ending eight (8) weeks after the soil temperature below the warm season turfgrass first reaches a temperature below about 14.5 degrees Celsius (58 degrees Fahrenheit) in the autumn or following the summer solstice.

In some aspects, the contacting may occur during the period of time beginning when the average daily soil temperature below the warm season turfgrass first reaches a temperature below about 18.9 degrees Celsius (66 degrees Fahrenheit) in the autumn or following the summer solstice, and ending ten (10) weeks later. In some aspects, the contacting may occur during the period of time beginning when the average daily soil temperature below the warm season turfgrass first reaches a temperature below about 18.9 degrees Celsius (66 degrees Fahrenheit) in the autumn or following the summer solstice, and ending eight (8) weeks later. In some aspects, the contacting may occur during the period of time beginning when the average daily soil temperature below the warm season turfgrass first reaches a temperature below about 18.9 degrees Celsius (66 degrees Fahrenheit) in the autumn or following the summer solstice, and ending five (5) weeks later. In some aspects, the contacting may occur during the period of time beginning when the average daily soil temperature below the warm season turfgrass first reaches a temperature below about 18.9 degrees Celsius (66 degrees Fahrenheit) in the autumn or following the summer solstice, and ending two (2) weeks later. In other aspects, the contacting may occur during the period of time beginning one (1) week and ending ten (10) weeks after the average daily soil temperature below the warm season turfgrass first reaches a temperature below about 18.9 degrees Celsius (66 degrees Fahrenheit) in the autumn or following the summer solstice. In still other aspects, the contacting may occur during the period of time beginning two (2) weeks and ending ten (10) weeks after the average daily soil temperature below the warm season turfgrass first reaches a temperature below about 18.9 degrees Celsius (66 degrees Fahrenheit) in the autumn or following the summer solstice. In yet other aspects, the contacting may occur during the period of time beginning two (2) weeks and ending five (5) weeks after the average daily soil temperature below the warm season turfgrass first reaches a temperature below about 18.9 degrees Celsius (66 degrees Fahrenheit) in the autumn or following the summer solstice. According to some other aspects, the contacting may occur during the period of time beginning two (2) weeks and ending eight (8) weeks after the average daily soil temperature below the warm season turfgrass first reaches a temperature below about 18.9 degrees Celsius (66 degrees Fahrenheit) in the autumn or following the summer solstice. In all such aspects, the average daily soil temperature may be calculated on a weekly basis.

In some aspects, the contacting may occur during the period of time beginning when the average daily soil temperature below the warm season turfgrass first reaches a temperature below about 18.4 degrees Celsius (65 degrees Fahrenheit) in the autumn or following the summer solstice, and ending ten (10) weeks later. In some aspects, the contacting may occur during the period of time beginning when the average daily soil temperature below the warm season turfgrass first reaches a temperature below about 18.4 degrees Celsius (65 degrees Fahrenheit) in the autumn or following the summer solstice, and ending eight (8) weeks later. In some aspects, the contacting may occur during the period of time beginning when the average daily soil temperature below the warm season turfgrass first reaches a temperature below about 18.4 degrees Celsius (65 degrees Fahrenheit) in the autumn or following the summer solstice, and ending five (5) weeks later. In some aspects, the contacting may occur during the period of time beginning when the average daily soil temperature below the warm season turfgrass first reaches a temperature below about 18.4 degrees Celsius (65 degrees Fahrenheit) in the autumn or following the summer solstice, and ending two (2) weeks later. In other aspects, the contacting may occur during the period of time beginning one (1) week and ending ten (10) weeks after the average daily soil temperature below the warm season turfgrass first reaches a temperature below about 18.4 degrees Celsius (65 degrees Fahrenheit) in the autumn or following the summer solstice. In still other aspects, the contacting may occur during the period of time beginning two (2) weeks and ending ten (10) weeks after the average daily soil temperature below the warm season turfgrass first reaches a temperature below about 18.4 degrees Celsius (65 degrees Fahrenheit) in the autumn or following the summer solstice. In yet other aspects, the contacting may occur during the period of time beginning two (2) weeks and ending five (5) weeks after the average daily soil temperature below the warm season turfgrass first reaches a temperature below about 18.4 degrees Celsius (65 degrees Fahrenheit) in the autumn or following the summer solstice. According to some other aspects, the contacting may occur during the period of time beginning two (2) weeks and ending eight (8) weeks after the average daily soil temperature below the warm season turfgrass first reaches a temperature below about 18.4 degrees Celsius (65 degrees Fahrenheit) in the autumn or following the summer solstice. In all such aspects, the average daily soil temperature may be calculated on a weekly basis.

In some aspects, the contacting may occur during the period of time beginning when the about 15.6 degrees Celsius (60 degrees Fahrenheit) in the autumn or following the summer solstice, and ending ten (10) weeks later. In other aspects, the contacting may occur during the period of time beginning when the average daily soil temperature below the warm season turfgrass first reaches a temperature below about 15.6 degrees Celsius (60 degrees Fahrenheit) in the autumn or following the summer solstice, and ending five (5) weeks later. In other aspects, the contacting may occur during the period of time beginning when the average daily soil temperature below the warm season turfgrass first reaches a temperature below about 15.6 degrees Celsius (60 degrees Fahrenheit) in the autumn or following the summer solstice, and ending eight (8) weeks later. In other aspects, the contacting may occur during the period of time beginning when the average daily soil temperature below the warm season turfgrass first reaches a temperature below about 15.6 degrees Celsius (60 degrees Fahrenheit) in the autumn or following the summer solstice, and ending two (2) weeks later. In other aspects, the contacting may occur during the period of time beginning one (1) week and ending ten (10) weeks after the average daily soil temperature below the warm season turfgrass first reaches a temperature below about 15.6 degrees Celsius (60 degrees Fahrenheit) in the autumn or following the summer solstice. In still other aspects, the contacting may occur during the period of time beginning two (2) weeks and ending ten (10) weeks after the average daily soil temperature below the warm season turfgrass first reaches a temperature below about 15.6 degrees Celsius (60 degrees Fahrenheit) in the autumn or following the summer solstice. In yet other aspects, the contacting may occur during the period of time beginning two (2) weeks and ending five (5) weeks after the average daily soil temperature below the warm season turfgrass first reaches a temperature below about 15.6 degrees Celsius (60 degrees Fahrenheit) in the autumn or following the summer solstice. According to some other aspects, the contacting may occur during the period of time beginning two (2) weeks and ending eight (8) weeks after the average daily soil temperature below the warm season turfgrass first reaches a temperature below about 15.6 degrees Celsius (60 degrees Fahrenheit) in the autumn or following the summer solstice. In all such aspects, the average daily soil temperature may be calculated on a weekly basis.

In some aspects, the contacting may occur during the period of time beginning when the average daily soil temperature below the warm season turfgrass first reaches a temperature below about 14.5 degrees Celsius (58 degrees Fahrenheit) in the autumn or following the summer solstice, and ending ten (10) weeks later. In other aspects, the contacting may occur during the period of time beginning when the average daily soil temperature below the warm season turfgrass first reaches a temperature below about 14.5 degrees Celsius (58 degrees Fahrenheit) in the autumn or following the summer solstice, and ending two (2) weeks later. In some aspects, the contacting may occur during the period of time beginning when the average daily soil temperature below the warm season turfgrass first reaches a temperature below about 14.5 degrees Celsius (58 degrees Fahrenheit) in the autumn or following the summer solstice, and ending eight (8) weeks later. In other aspects, the contacting may occur during the period of time beginning when the average daily soil temperature below the warm season turfgrass first reaches a temperature below about 14.5 degrees Celsius (58 degrees Fahrenheit) in the autumn or following the summer solstice, and ending five (5) weeks later. In other aspects, the contacting may occur during the period of time beginning one (1) week and ending ten (10) weeks after the average daily soil temperature below the warm season turfgrass first reaches a temperature below about 14.5 degrees Celsius (58 degrees Fahrenheit) in the autumn or following the summer solstice. In still other aspects, the contacting may occur during the period of time beginning two (2) weeks and ending ten (10) weeks after the about 14.5 degrees Celsius (58 degrees Fahrenheit) in the autumn or following the summer solstice. In yet other aspects, the contacting may occur during the period of time beginning two (2) weeks and ending five (5) weeks after the average daily soil temperature below the warm season turfgrass first reaches a temperature below about 14.5 degrees Celsius (58 degrees Fahrenheit) in the autumn or following the summer solstice. According to some other aspects, the contacting may occur during the period of time beginning two (2) weeks and ending eight (8) weeks after the average daily soil temperature below the warm season turfgrass first reaches a temperature below about 14.5 degrees Celsius (58 degrees Fahrenheit) in the autumn or following the summer solstice. In all such aspects, the average daily soil temperature may be calculated on a weekly basis.

As used herein, the term "soil temperature," in all of its forms, including its use in the terms "daily soil temperature," "average daily soil temperature," and "seven day mean soil temperature" refers to a soil temperature measured or determined according to any manner generally recognized in the art, including but not limited to, direct soil temperature measurements that may be measured in soil below a stand of turfgrass to be cultivated or treated, direct soil temperature measurements performed on a soil that is reasonably close to the location of the turfgrass stand to be treated such that the measurement can be expected to be a reasonable approximation of the soil temperature below the stand of turfgrass, or soil temperatures that may be determined from a regional report or database that can be reasonably expected to approximate the soil temperature below the stand of turfgrass being treated. Generally, soil temperature measurements are measured at about five (5) centimeters depth below the soil surface or below the base of the stand of turfgrass.

In another aspect, the early post-emergence growth state may be a time point or period of time for thiencarbazone-methyl application that is defined by the air temperature surrounding the stand of turfgrass or the meteorological temperature measured or predicted for the geographical area in which the stand of warm season turfgrass is located. As used herein, the term "air temperature," in all of its forms, including in its use in "daily air temperature," "seven day mean air temperature," and "daily average air temperature," refers to an air temperature measured or determined according to any manner generally recognized in the art, including but not limited to, direct air temperature measurements that may be measured in the air surrounding a stand of turfgrass to be cultivated or treated, direct air temperature measurements measured in a location that is reasonably close to the location of the turfgrass stand to be treated such that the measurement can be expected to be a reasonable approximation of the air temperature surrounding the stand of turfgrass, or air temperatures that may be determined from a regional report or database that can be reasonably expected to approximate the air temperature surrounding the stand of turfgrass being treated. Generally, air temperature is measured at a particular location at about two (2) meters above the ground surface or above the stand of warm season turfgrass.

The contacting of the *Poa annua* with thiencarbazone-methyl may occur, or be restricted to, when the air temperature surrounding the warm season turfgrass is less than about 18.5 degrees Celsius (65 degrees Fahrenheit), or less than about 15.6 degrees Celsius (60 degrees Fahrenheit), or less than about 12.8 degrees Celsius (55 degrees Fahrenheit). In certain instances, the *Poa annua* may be contacted with thiencarbazone-methyl within about one (1) week, two (2)

weeks, three (3) weeks, five (5) weeks, eight (8) weeks, or ten (10) weeks of when the air temperature first falls below about 18.4 degrees Celsius (65 degrees Fahrenheit) in the autumn or following the summer solstice. In other instances, the *Poa annua* may be contacted with thiencarbazone-methyl within about one (1) week, two (2) weeks, three (3) weeks, five (5) weeks, eight (8) weeks, or ten (10) weeks of when the air temperature first falls below about 15.6 degrees Celsius (60 degrees Fahrenheit) in the autumn or following the summer solstice. In still other instances, the *Poa annua* may be contacted with thiencarbazone-methyl within about one (1) week, two (2) weeks, three (3) weeks, five (5) weeks, eight (8) weeks, or ten (10) weeks of when the air temperature first falls below about 12.8 degrees Celsius (55 degrees Fahrenheit) in the autumn or following the summer solstice.

According to certain aspects of the present disclosure, the contacting may occur, or be restricted to, when the average daily air temperature below the warm season turfgrass is below about 18.4 degrees Celsius (65 degrees Fahrenheit) for the preceding week prior to contacting. In other aspects, the contacting may occur when the average daily air temperature below the warm season turfgrass is below about 15.6 degrees Celsius (60 degrees Fahrenheit) for the preceding week prior to contacting. In still other aspects, the contacting may occur when the average daily air temperature below the warm season turfgrass is below about 12.8 degrees Celsius (55 degrees Fahrenheit) for the preceding week prior to contacting. In such instances, the average daily air temperature may be calculated on a weekly basis.

In other instances, the contacting of the *Poa annua* with thiencarbazone-methyl may occur, or be restricted to, when the air temperature surrounding the warm season turfgrass is from about 0 degrees Celsius (32 degrees Fahrenheit) to about 18.4 degrees Celsius (65 degrees Fahrenheit), or from about 4.5 degrees Celsius (40 degrees Fahrenheit) to about 18.4 degrees Celsius (65 degrees Fahrenheit), or from about 1.7 degrees Celsius (35 degrees Fahrenheit) to about 18.4 degrees Celsius (65 degrees Fahrenheit), or from about 1.7 degrees Celsius (35 degrees Fahrenheit) to about 15.6 degrees Celsius (60 degrees Fahrenheit).

In still other instances, the contacting may occur when the average daily air temperature surrounding the warm season turfgrass comprising *Poa annua* is from about 0 degrees Celsius (32 degrees Fahrenheit) to about 18.4 degrees Celsius (65 degrees Fahrenheit), or from about 4.5 degrees Celsius (40 degrees Fahrenheit) to about 18.4 degrees Celsius (65 degrees Fahrenheit), or from about 1.7 degrees Celsius (35 degrees Fahrenheit) to about 18.4 degrees Celsius (65 degrees Fahrenheit), or from about 1.7 degrees Celsius (35 degrees Fahrenheit) to about 15.6 degrees Celsius (60 degrees Fahrenheit), for the preceding week prior to contacting. In such instances, the average daily air temperature may be calculated on a weekly basis.

In some aspects, the contacting may occur during the period of time beginning when the air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice, and ending ten (10) weeks later. In some aspects, the contacting may occur during the period of time beginning when the air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice, and ending eight (8) weeks later. In some aspects, the contacting may occur during the period of time beginning when the air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice, and ending five (5) weeks later. In some aspects, the contacting may occur during the period of time beginning when the air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice, and ending two (2) weeks later. In other aspects, the contacting may occur during the period of time beginning one (1) week and ending ten (10) weeks after the air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice. In still other aspects, the contacting may occur during the period of time beginning two (2) weeks and ending ten (10) weeks after the air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice. In other aspects, the contacting may occur during the period of time beginning two (2) weeks and ending five (5) weeks after the air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice. In some other aspects, the contacting may occur during the period of time beginning two (2) weeks and ending eight (8) weeks after the air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice.

According to some aspects, the contacting may occur during the period of time beginning when the average daily air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice, and ending ten (10) weeks later. According to some aspects, the contacting may occur during the period of time beginning when the average daily air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice, and ending eight (8) weeks later. According to some aspects, the contacting may occur during the period of time beginning when the average daily air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice, and ending five (5) weeks later. According to some aspects, the contacting may occur during the period of time beginning when the average daily air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice, and ending two (2) weeks later. In other embodiments, the contacting may occur during the period of time beginning one (1) week and ending ten (10) weeks after the average daily air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice. In still other embodiments, the contacting may occur during the period of time beginning two (2) weeks and ending ten (10) weeks after the average daily air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice. In other embodiments, the contacting may occur during the period of time beginning two (2) weeks and ending five (5) weeks after the average daily air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice. In still other embodiments, the contacting may occur during the period of time beginning two (2) weeks and ending six (6) weeks after the average daily air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice. In yet other embodiments, the contacting may occur during the period of time beginning two (2) weeks and ending eight (8) weeks after the average daily air temperature surrounding the warm season turfgrass first reaches a temperature less than about 18.4 degrees Celsius (65 degrees Fahrenheit), or less than about 15.6 degrees Celsius (60 degrees Fahrenheit), or less than about 12.8 degrees Celsius (55 degrees Fahrenheit), in the autumn or following the summer solstice. In all such embodiments, the average daily air temperature may be calculated on a weekly basis.

In certain embodiments, the early post-emergence growth state may be a time point or period of time for thiencarbazone-methyl application that is defined by the state of the *Poa annua* plants themselves. In such instances, the contacting may occur during, or alternatively be restricted to, the period of time in which the *Poa annua* plants are characterized as having two or fewer tillers. In certain embodiments, the early post-emergence growth state may be the period of time in which substantially all of the *Poa annua* plants in the stand of warm season turfgrass are characterized as having two or fewer tillers. In still other embodiments, the early post-emergence growth state may be the period of time in which the majority or at least 80% of the *Poa annua* plants in the stand of warm season turfgrass are characterized as having two or fewer tillers.

In still other embodiments, the early post-emergence growth state may be the period of time in which the *Poa annua* plants lack inflorescences or are characterized as being in a pre-inflorescence growth stage. In other embodiments, the early post-emergence growth state may be the period of time in which the majority or at least 80% of the *Poa annua* plants lack inflorescences or are characterized as being in a pre-inflorescence growth stage. In still other aspects of the present disclosure, the early post-emergence growth state may be the period of time in which the substantially all of the *Poa annua* plants lack inflorescences or are characterized as being in a pre-inflorescence growth stage.

According to other aspects of the present disclosure, the early post-emergence growth state may be a time point or period of time for thiencarbazone-methyl application that is defined by a period of time after which the emergence of the *Poa annua* plants is first detected. For example, the contacting may occur during, or be restricted to, the period of time beginning one (1) week and ending ten (10) weeks after the new emergence of one or more *Poa annua* plants is first detected in the stand of warm season turfgrass during the autumn or following the summer solstice. In other non-limiting examples, the contacting may occur during, or be restricted to, the period of time beginning when the new emergence of one or more *Poa annua* plants is first detected in the stand of warm season turfgrass during the autumn or following the summer solstice, and ending ten (10) weeks, or eight (8) weeks, or six (6) weeks, or five (5) weeks, or two (2) weeks later.

Various additional exemplary methods for controlling *Poa annua* in a stand of warm season turfgrass are disclosed in FIGS. 1-9. These methods involve monitoring either the daily soil temperature or daily air temperature proximal to a stand of warm season turfgrass and determining or predicting the time of *Poa annua* emergence and/or the time period of *Poa annua* susceptibility to the application of thiencarbazone-methyl. These methods allow for the effective treatment of *Poa annua* in stands of warm season turfgrass before *Poa annua* may be visually observable above the turfgrass canopy and even in the absence of having to visually inspect the stands of turfgrass to determine whether *Poa annua* has emerged. Furthermore, the Applicant has determined that these methods provide for increased control of *Poa annua* using thiencarbazone-methyl treatments by identifying the earliest post-emergence period of *Poa annua* independent with application to a multitude of geographic locations where warm season turfgrass is grown or cultivated. FIG. 1 is a diagrammatic representation of a method 100 for controlling *Poa annua* in a stand of warm season turfgrass. As shown in FIG. 1, method 100 includes, at block 102, monitoring the daily soil temperature below the stand of warm season turfgrass. At block 104, method 100 includes determining a seven day mean soil temperature based on the daily soil temperature monitoring. As used herein, the term "seven day mean soil temperature" refers to the mean soil temperature over any consecutive seven (7) day period based on daily soil temperatures collected daily during the consecutive seven (7) day period. As used herein, the term "daily soil temperature," in all of its forms, refers to the average soil temperature for a particular day.

At block 106, method 100 includes determining when the seven day mean soil temperature first falls below a predetermined temperature following the summer solstice or during the autumn. In some instances, the predetermined temperature may be 18.9 degrees Celsius (66 degrees Fahrenheit). In other instances, the predetermined temperature may be 18.4 degrees Celsius (65 degrees Fahrenheit), or 15.6 degrees Celsius (60 degrees Fahrenheit), or 14.5 degrees Celsius (58 degrees Fahrenheit). At block 108, method 100 includes contacting the stand of warm season turfgrass with an herbicidally effective amount of thiencarbazone-methyl during the period of time beginning when the seven day mean soil temperature falls below the predetermined temperature and ending a predetermined amount of time later. The predetermined amount of time later may in some instances be ten (10) weeks. In other instances, the predetermined amount of time later may be one (1) week, or two (2) weeks, or three (3) weeks, or five (5) weeks, or eight (8) weeks. In at least some instances, method 100 may include contacting the stand of warm season turfgrass with an herbicidally effective amount of thiencarbazone-methyl after the seven day mean soil temperature below the warm season turfgrass first falls below the predetermined temperature following the summer solstice or during the autumn, and before the emergence of one or more *Poa annua* plants is visually observable above a turfgrass canopy in the stand of the turfgrass.

Figure 2:
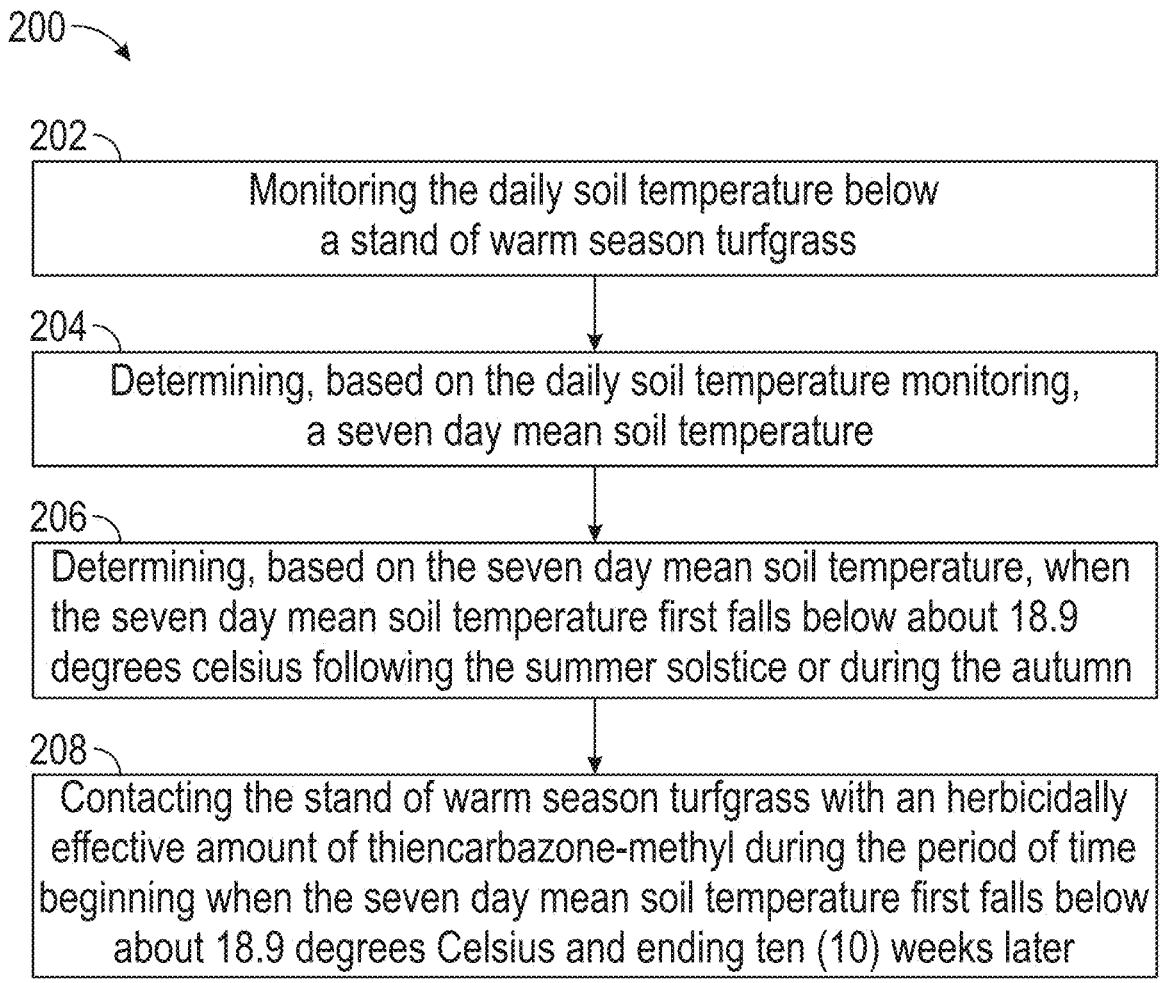
FIG. 2 is a diagrammatic representation of an example method for controlling *Poa annua* in a stand of warm season turfgrass that includes, among other features, determining when the seven day mean soil temperature first falls below about 18.9 degrees Celsius, according to an exemplary embodiment of the present disclosure.

FIG. 2 provides a diagrammatic representation of method 200 which is a specific embodiment of general method 100 in which the predetermined temperature is 18.9 degrees Celsius (66 degrees Fahrenheit) and the predetermined amount of time later is ten (10) weeks. As shown in FIG. 2, method 200 includes, at block 202, monitoring the daily soil temperature below the stand of warm season turfgrass. At block 204, method 200 includes determining a seven day mean soil temperature based on the daily soil temperature monitoring. At block 206, method 200 includes determining when the seven day mean soil temperature first falls below about 18.9 degrees Celsius (about 66 degrees Fahrenheit) following the summer solstice or during the autumn. At block 208, method 200 includes contacting the stand of warm season turfgrass with an herbicidally effective amount of thiencarbazone-methyl during the period of time beginning when the seven day mean soil temperature falls below about 18.9 degrees Celsius (about 66 degrees Fahrenheit) and ending ten (10) weeks later. In at least some instances, method 200 may include contacting the stand of warm season turfgrass with an herbicidally effective amount of thiencarbazone-methyl after the seven day mean soil temperature below the warm season turfgrass first falls below about 18.9 degrees Celsius (66 degrees Fahrenheit) following the summer solstice or during the autumn, and before the emergence of one or more *Poa annua* plants is visually observable above a turfgrass canopy in the stand of the turfgrass.

Figure 3:
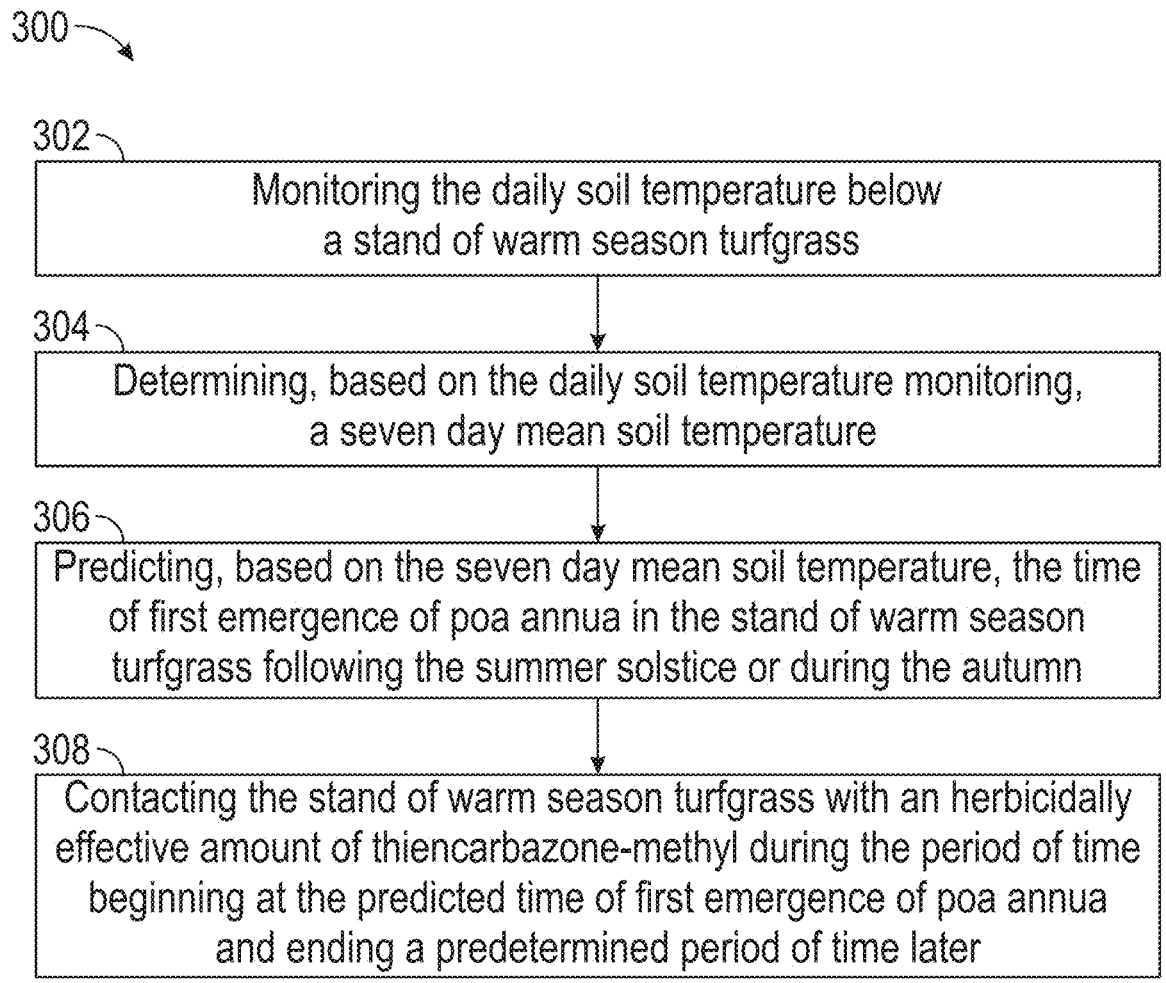
FIG. 3 is a diagrammatic representation of an example method for controlling *Poa annua* in a stand of warm season turfgrass that includes, among other features, predicting the time of first emergence of *Poa annua* in a stand of warm season turfgrass based on seven day mean soil temperature, according to an exemplary embodiment of the present disclosure.

FIG. 3 provides a diagrammatic representation of method 300 for controlling *Poa annua* in a stand of warm season turfgrass. As shown in FIG. 3, at block 302, method 300 includes monitoring the daily soil temperature below a stand of warm season turfgrass. At block 304, method 300 includes determining a seven day mean soil temperature based on the daily soil temperature monitoring. At block 306, method 300 includes predicting the time of first emergence of *Poa annua* in the stand of warm season turfgrass following the summer solstice, or during the autumn, based on the seven day mean soil temperature. For example, the prediction of the time of first emergence may based on when the seven day mean soil temperature first falls below a predetermined temperature or may be when the seven day mean soil temperature first falls in a predetermined range of temperatures, following the summer solstice or during the autumn. At block 308, method 300 further includes contacting the stand of warm season turfgrass with an herbicidally effective amount of thiencarbazone-methyl during the period of time beginning at the predicted time of first emergence of *Poa annua* and ending a predetermined period of time later. The predetermined amount of time later may in some instances be ten (10) weeks. In other instances, the predetermined amount of time later may be one (1) week, or two (2) weeks, or three (3) weeks, or five (5) weeks, or eight (8) weeks. In at least some instances, method 300 may include contacting the stand of warm season turfgrass with an herbicidally effective amount of thiencarbazone-methyl after the predicted time of first emergence of *Poa annua* and before the emergence of one or more *Poa annua* plants is visually observable above a turfgrass canopy in the stand of the turfgrass.

Figure 4:
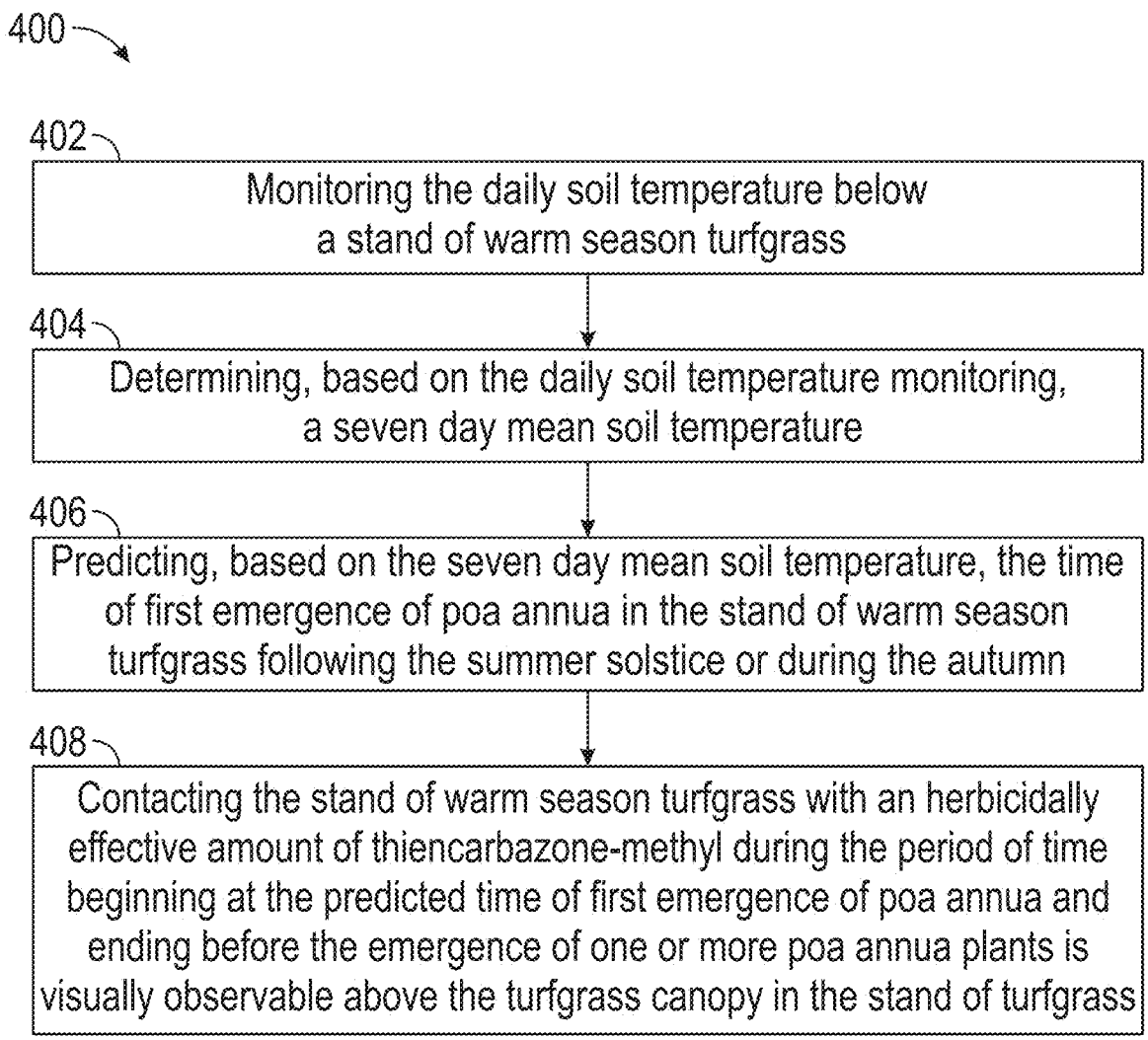
FIG. 4 is a diagrammatic representation of an example method for controlling *Poa annua* in a stand of warm season turfgrass that includes, among other features, predicting the time of first emergence of *Poa annua* in a stand of warm season turfgrass based on seven day mean soil temperature, according to an exemplary embodiment of the present disclosure.

FIG. 4 provides a diagrammatic representation of method 400 for controlling *Poa annua* in a stand of warm season turfgrass. As shown in FIG. 4, at block 402, method 400 includes monitoring the daily soil temperature below a stand of warm season turfgrass. At block 404, method 400 includes determining a seven day mean soil temperature based on the daily soil temperature monitoring. At block 406, method 400 includes predicting the time of first emergence of *Poa annua* in the stand of warm season turfgrass following the summer solstice, or during the autumn, based on the seven day mean soil temperature. For example, the prediction of the time of first emergence may based on when the seven day mean soil temperature first falls below a predetermined temperature or may be when the seven day mean soil temperature first falls in a predetermined range of temperatures, following the summer solstice or during the autumn. At block 408, method 400 further includes contacting the stand of warm season turfgrass with an herbicidally effective amount of thiencarbazone-methyl during the period of time beginning at the predicted time of first emergence of *Poa annua* and ending before the emergence of one or more *Poa annua* plants is visually observable above a turfgrass canopy in the stand of the turfgrass.

Figure 5:
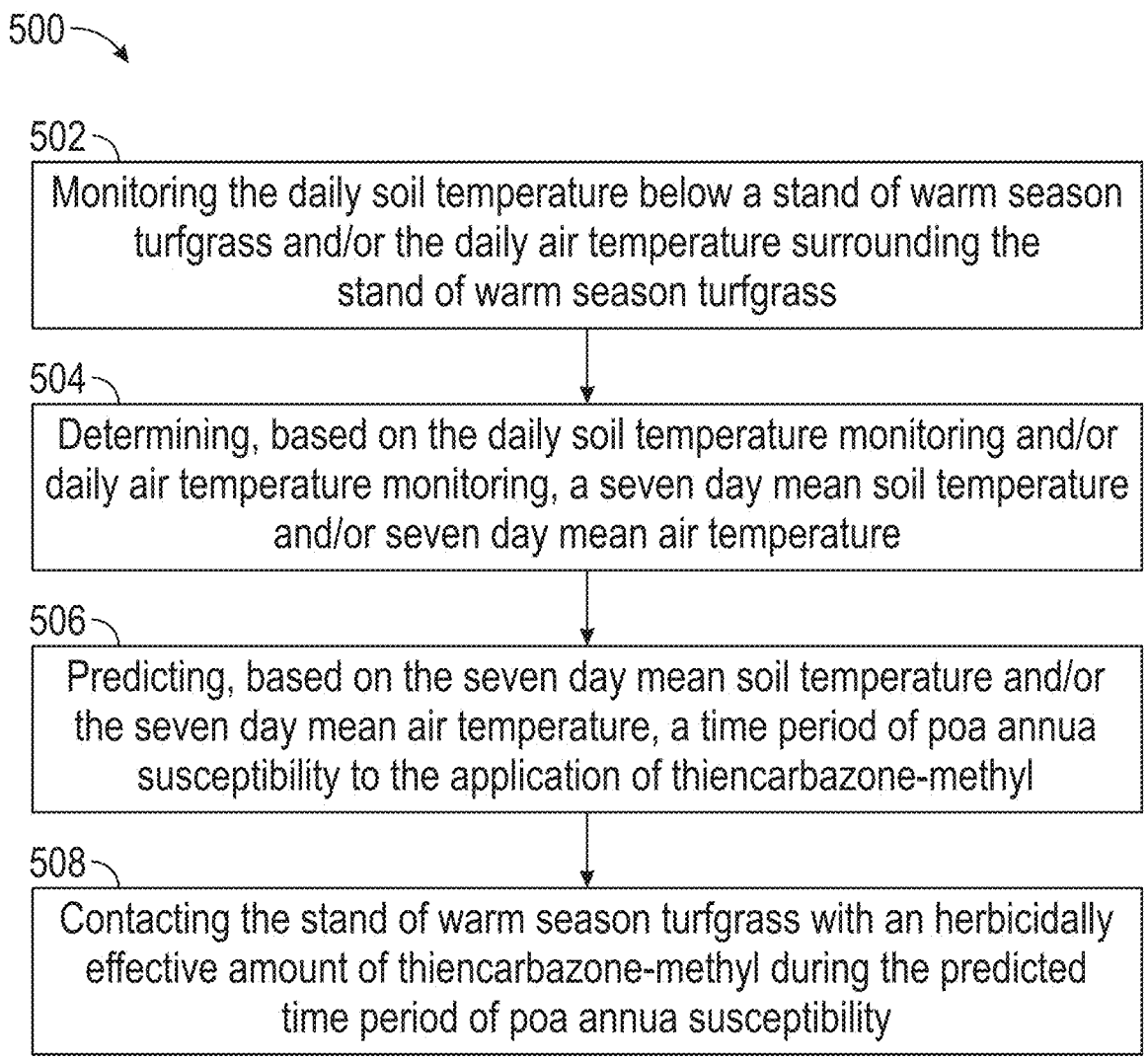
FIG. 5 is a diagrammatic representation of an example method for controlling *Poa annua* in a stand of warm season turfgrass that includes, among other features, predicting a time period of *Poa annua* susceptibility to the application of thiencarbazone-methyl based on the seven day mean soil temperature and/or the seven day mean air temperature proximal to the stand o warm season turfgrass, according to an exemplary embodiment of the present disclosure.

FIG. 5 provides a diagrammatic representation of method 500 for controlling *Poa annua* in a stand of warm season turfgrass that involves predicting the time period of *Poa annua* susceptibility to the application of thiencarbazone-methyl based on the monitoring of either soil temperature or air temperature proximal to the stand of warm season turfgrass. As shown in FIG. 5, at block 502, method 500 includes monitoring the daily soil temperature below a stand of warm season turfgrass and/or monitoring the daily air temperature surrounding the stand of warm season turfgrass. At block 504, method 500 includes determining a seven day mean soil temperature based on the daily soil temperature monitoring and/or determining a seven day mean air temperature based on the daily soil temperature monitoring and/or the daily air temperature monitoring. At block 506, method 500 includes predicting a time of *Poa annua* susceptibility to the application of thiencarbazone-methyl, based on the seven day mean soil temperature and/or the seven day mean air temperature. For example, the prediction of the time period of *Poa annua* susceptibility may be based on one or more of the presently disclosed methods for determining or predicting the early post emergence period for *Poa annua*, including, for example, determining or predicting the time period of first emergence of *Poa annua* based on the seven day mean soil temperature and/or the seven day mean air temperature. At block 508, method 500 further includes contacting the stand of warm season turfgrass with an herbicidally effective amount of thiencarbazone-methyl during the predicted time period of *Poa annua* susceptibility.

Figure 6:
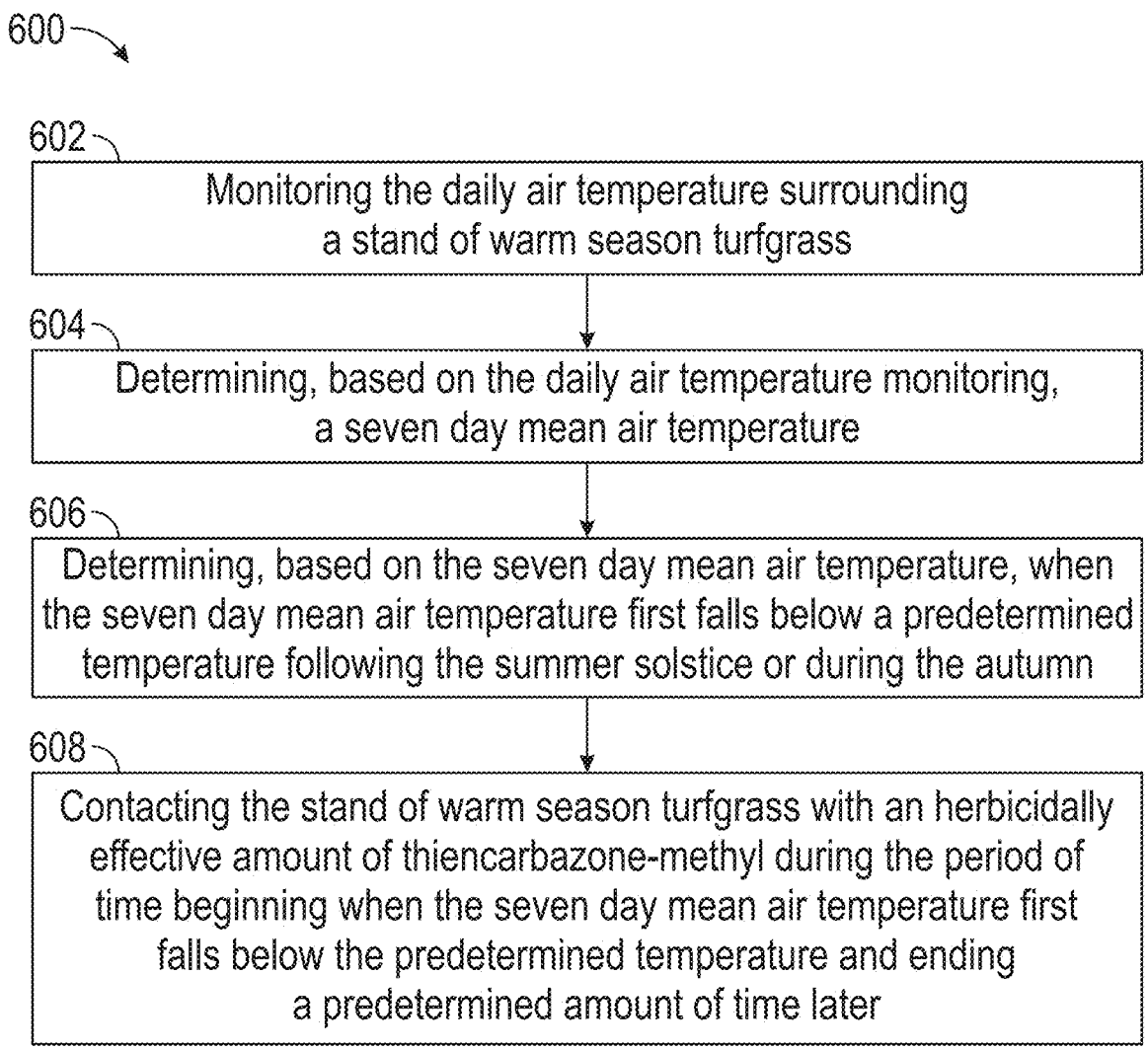
FIG. 6 is a diagrammatic representation of an example method for controlling *Poa annua* in a stand of warm season turfgrass that includes, among other features, daily air temperature monitoring, according to an exemplary embodiment of the present disclosure.

FIG. 6 is a diagrammatic representation of a method 600 for controlling *Poa annua* in a stand of warm season turfgrass. As shown in FIG. 6, method 600 includes, at block 602, monitoring the daily air temperature surrounding the stand of warm season turfgrass. At block 604, method 600 includes determining a seven day mean air temperature based on the daily air temperature monitoring. As used herein, the term "seven day mean air temperature" refers to the mean air temperature over any consecutive seven (7) day period based on daily air temperatures collected daily during the consecutive seven (7) day period. As used herein, the term "daily air temperature," in all of its forms, refers to the average air temperature for a particular day.

At block 606, method 600 includes determining when the seven day mean air temperature first falls below a predetermined temperature following the summer solstice or during the autumn. In some instances, the predetermined temperature may be 18.4 degrees Celsius (65 degrees Fahrenheit). In other instances, the predetermined temperature may be 15.6 degrees Celsius (60 degrees Fahrenheit), or 14.5 degrees Celsius (58 degrees Fahrenheit), or 12.8 degrees Celsius (55 degrees Fahrenheit). At block 608, method 600 includes contacting the stand of warm season turfgrass with an herbicidally effective amount of thiencarbazone-methyl during the period of time beginning when the seven day mean air temperature falls below the predetermined temperature and ending a predetermined amount of time later. The predetermined amount of time later may in some instances be ten (10) weeks. In other instances, the predetermined amount of time later may be one (1) week, or two (2) weeks, or three (3) weeks, or five (5) weeks, or eight (8) weeks. In at least some instances, method 100 may include contacting the stand of warm season turfgrass with an herbicidally effective amount of thiencarbazone-methyl after the seven day mean air temperature surrounding the warm season turfgrass first falls below the predetermined temperature following the summer solstice or during the autumn, and before the emergence of one or more *Poa annua* plants is visually observable above a turfgrass canopy in the stand of the turfgrass.

Figure 7:
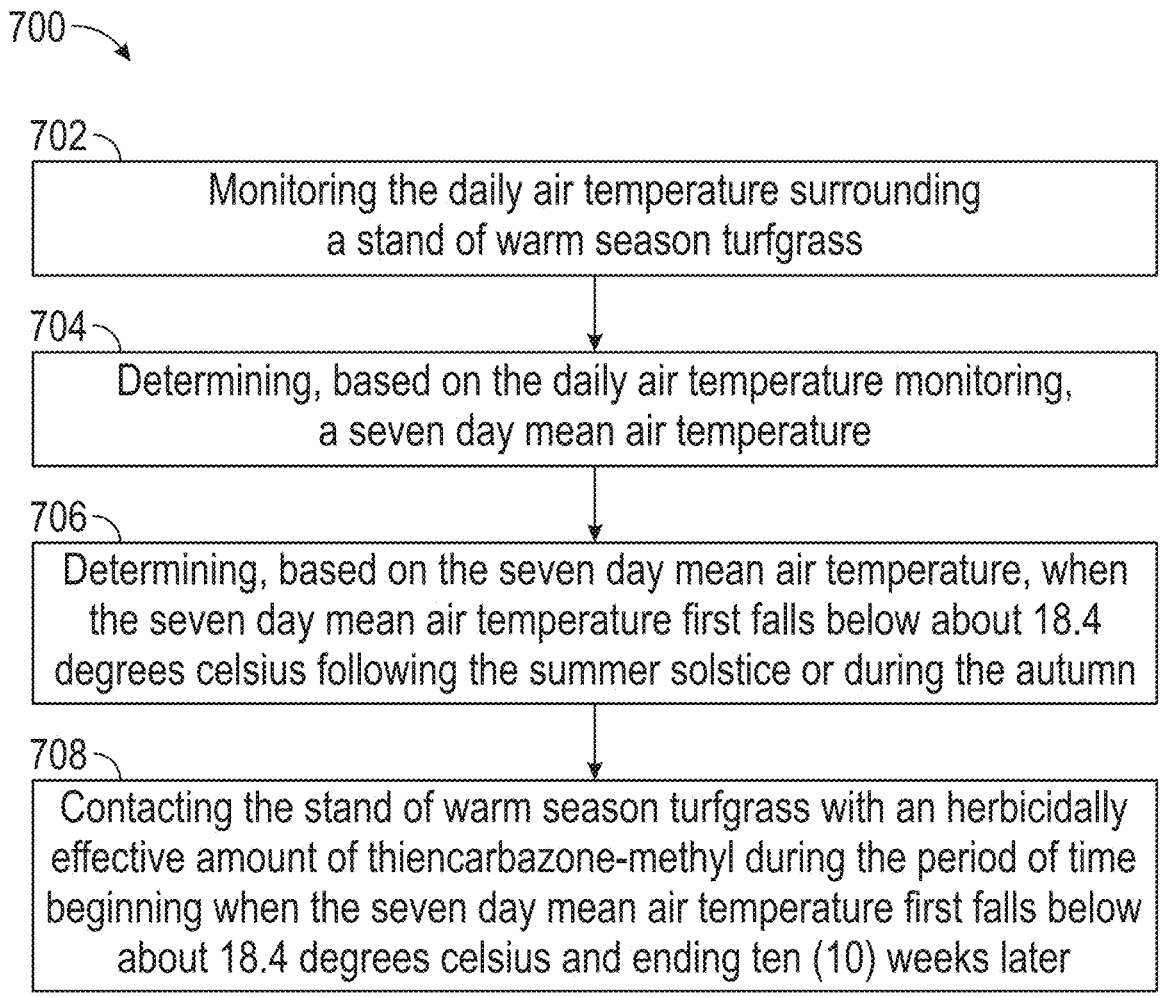
FIG. 7 is a diagrammatic representation of an example method for controlling *Poa annua* in a stand of warm season turfgrass that includes, among other features, determining when the seven day mean air temperature first falls below about 18.4 degrees Celsius, according to an exemplary embodiment of the present disclosure.

FIG. 7 provides a diagrammatic representation of method 700 which is a specific embodiment of general method 600 in which the predetermined temperature is 18.4 degrees Celsius (65 degrees Fahrenheit) and the predetermined amount of time later is ten (10) weeks. As shown in FIG. 7, method 700 includes, at block 702, monitoring the daily air temperature surrounding the stand of warm season turfgrass. At block 704, method 700 includes determining a seven day mean air temperature based on the daily air temperature monitoring. At block 706, method 700 includes determining when the seven day mean air temperature first falls below about 18.4 degrees Celsius (about 65 degrees Fahrenheit) following the summer solstice or during the autumn. At block 708, method 700 includes contacting the stand of warm season turfgrass with an herbicidally effective amount of thiencarbazone-methyl during the period of time beginning when the seven day mean air temperature falls below about 18.4 degrees Celsius (about 65 degrees Fahrenheit) and ending ten (10) weeks later. In at least some instances, method 700 may include contacting the stand of warm season turfgrass with an herbicidally effective amount of thiencarbazone-methyl after the seven day mean air temperature surrounding the warm season turfgrass first falls below about 18.4 degrees Celsius (65 degrees Fahrenheit) following the summer solstice or during the autumn, and before the emergence of one or more *Poa annua* plants is visually observable above a turfgrass canopy in the stand of the turfgrass.

Figure 8:
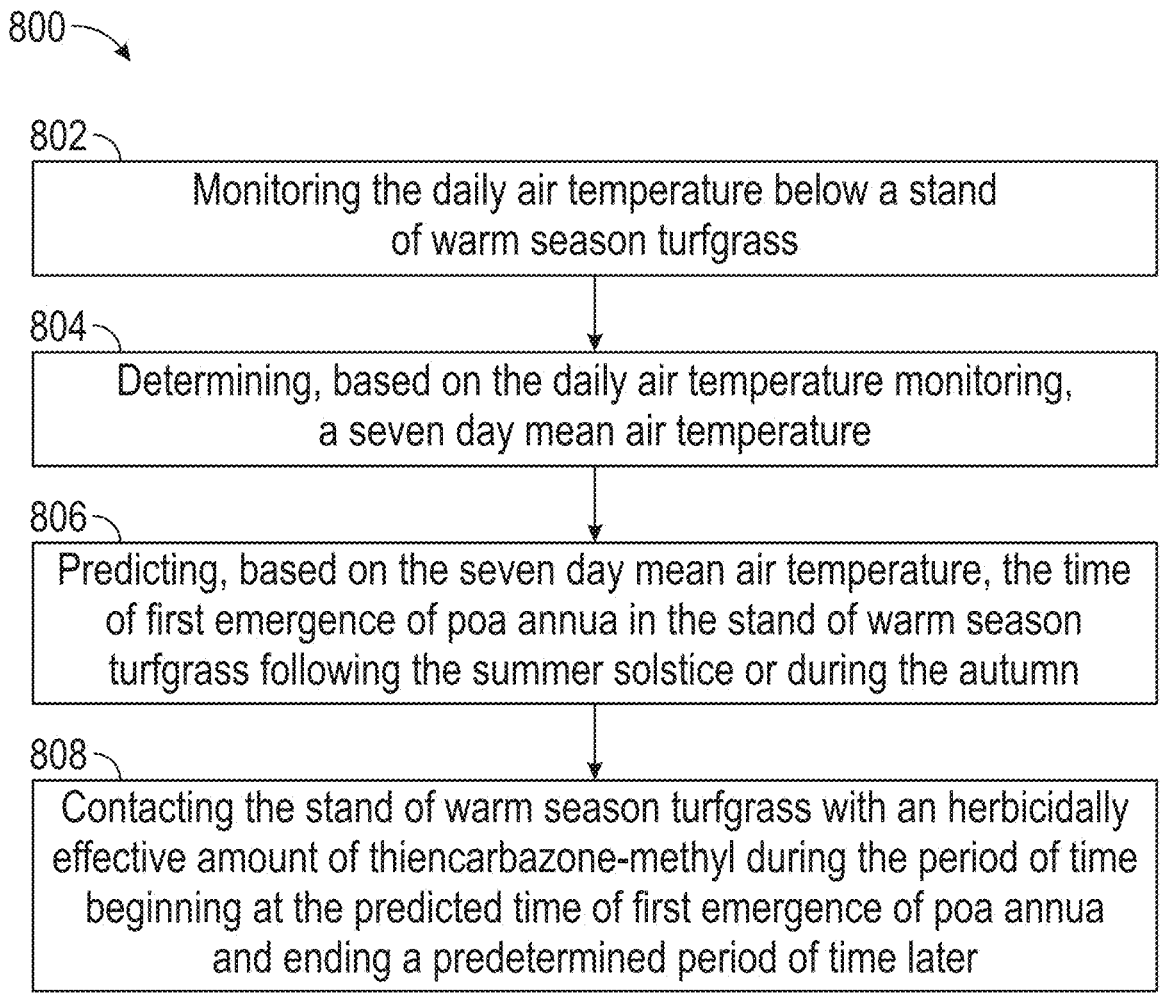
FIG. 8 is a diagrammatic representation of an example method for controlling *Poa annua* in a stand of warm season turfgrass that includes, among other features, predicting the time of first emergence of *Poa annua* in a stand of warm season turfgrass based on seven day mean air temperature, according to an exemplary embodiment of the present disclosure.

FIG. 8 provides a diagrammatic representation of method 800 for controlling *Poa annua* in a stand of warm season turfgrass. As shown in FIG. 8, at block 802, method 800 includes monitoring the daily air temperature surrounding a stand of warm season turfgrass. At block 804, method 800 includes determining a seven day mean air temperature based on the daily air temperature monitoring. At block 806, method 800 includes predicting the time of first emergence of *Poa annua* in the stand of warm season turfgrass following the summer solstice, or during the autumn, based on the seven day mean air temperature. For example, the prediction of the time of first emergence may based on when the seven day mean air temperature first falls below a predetermined temperature or may be when the seven day mean air temperature first falls in a predetermined range of temperatures, following the summer solstice or during the autumn. At block 808, method 800 further includes contacting the stand of warm season turfgrass with an herbicidally effective amount of thiencarbazone-methyl during the period of time beginning at the predicted time of first emergence of *Poa annua* and ending a predetermined period of time later. The predetermined amount of time later may in some instances be ten (10) weeks. In other instances, the predetermined amount of time later may be one (1) week, or two (2) weeks, or three (3) weeks, or five (5) weeks, or eight (8) weeks. In at least some instances, method 800 may include contacting the stand of warm season turfgrass with an herbicidally effective amount of thiencarbazone-methyl after the predicted time of first emergence of *Poa annua* and before the emergence of one or more *Poa annua* plants is visually observable above a turfgrass canopy in the stand of the turfgrass.

Figure 9:
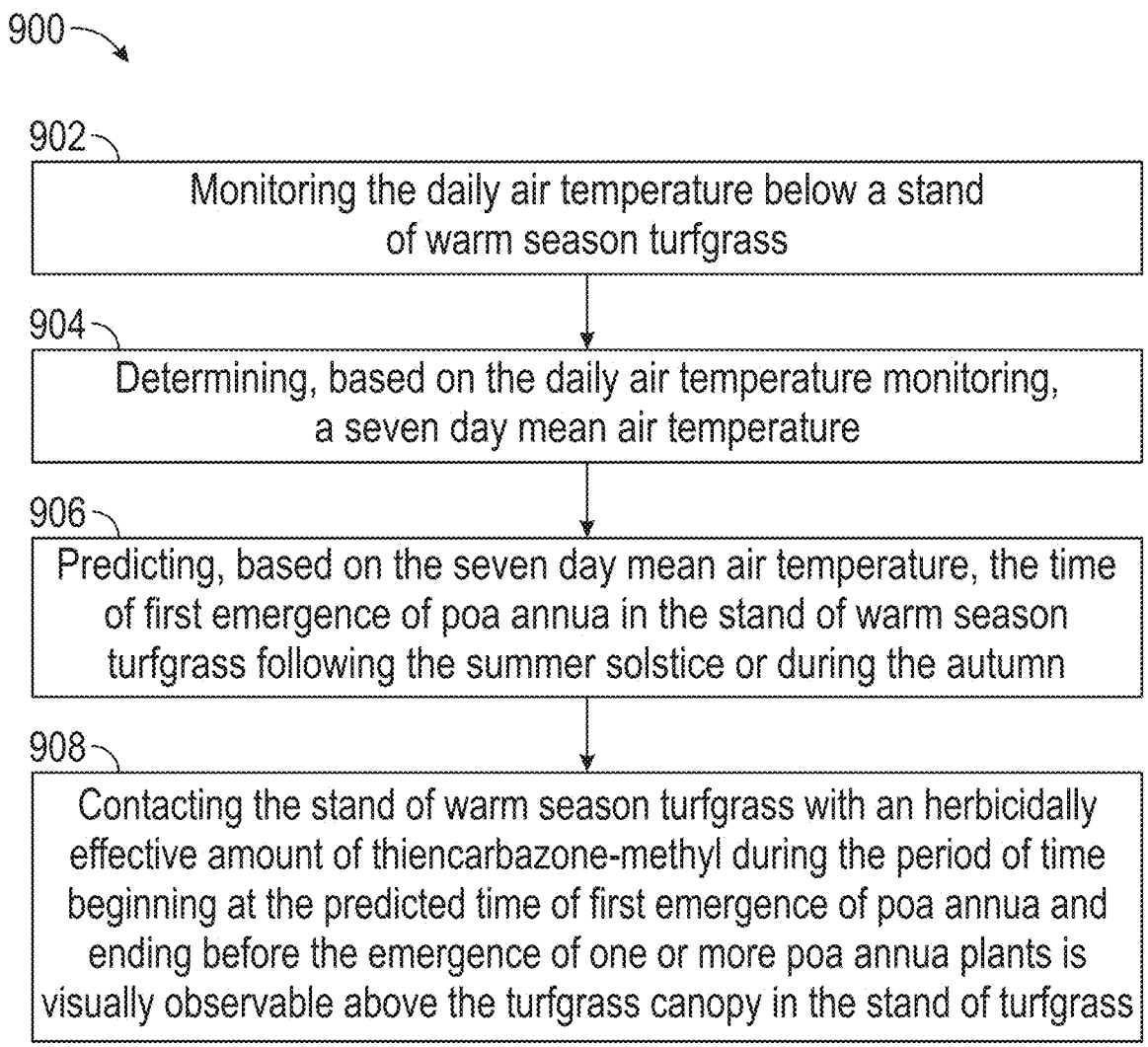
FIG. 9 is a diagrammatic representation of an example method for controlling *Poa annua* in a stand of warm season turfgrass that includes, among other features, predicting the time of first emergence of *Poa annua* in a stand of warm season turfgrass based on seven day mean air temperature, according to an exemplary embodiment of the present disclosure.

FIG. 9 provides a diagrammatic representation of method 900 for controlling *Poa annua* in a stand of warm season turfgrass. As shown in FIG. 9, at block 902, method 900 includes monitoring the daily air temperature surrounding a stand of warm season turfgrass. At block 904, method 900 includes determining a seven day mean air temperature based on the daily air temperature monitoring. At block 906, method 900 includes predicting the time of first emergence of *Poa annua* in the stand of warm season turfgrass following the summer solstice, or during the autumn, based on the seven day mean air temperature. For example, the prediction of the time of first emergence may based on when the seven day mean air temperature first falls below a predetermined temperature or may be when the seven day mean air temperature first falls in a predetermined range of temperatures, following the summer solstice or during the autumn. At block 908, method 900 further includes contacting the stand of warm season turfgrass with an herbicidally effective amount of thiencarbazone-methyl during the period of time beginning at the predicted time of first emergence of *Poa annua* and ending before the emergence of one or more *Poa annua* plants is visually observable above a turfgrass canopy in the stand of the turfgrass.

The *Poa annua* or stand of warm season turfgrass suffering from an infestation of *Poa annua* or in need of prophylactic treatment may be contacted with thiencarbazone-methyl in any herbicidally effective manner. For example, in certain embodiments, contacting the *Poa annua* or the stand of warm season turfgrass with an herbicidally effective amount of thiencarbazone-methyl may include, applying or causing the application of one or more compositions comprising an herbicidally effective amount of thiencarbazone-methyl to the stand of warm season turfgrass such that *Poa annua* is contacted by an herbicidally effective amount of thiencarbazone-methyl. In certain aspects, the method may include spraying an herbicidally effective amount of an herbicidal composition or liquid solution comprising thiencarbazone-methyl onto the *Poa annua* or the stand of warm season turfgrass such that the *Poa annua* is contacted by the herbicidal composition or liquid solution. The presently disclosed methods may also include treating a stand of warm season turfgrass infested with *Poa annua* or treating an infestation of *Poa annua* in a stand of warm season turfgrass by contacting the stand of warm season turfgrass with an herbicidally effective amount of thiencarbazone-methyl while the *Poa annua* is in an early post-emergence growth state. In such instances, the method may also include applying an herbicidal composition or a liquid solution comprising thiencarbazone-methyl directly to the *Poa annua* in the stand of warm season turfgrass as a spot spray.

In at least certain aspects, the contacting may occur in the absence of contacting the stand of warm season turfgrass comprising *Poa annua* with any other herbicidal active ingredient. In other aspects, the contacting may occur in the absence of contacting the stand of warm season turfgrass comprising *Poa annua* with any other herbicidal active ingredient effective for the control or suppression of *Poa annua*. In some cases, no other herbicidal active ingredients may be contacted with the stand of warm season turfgrass comprising *Poa annua* when *Poa annua* is in an early post-emergence growth state. In certain other aspects, no other herbicidal active ingredients effective for the control or suppression of *Poa annua* are contacted with the stand of warm season turfgrass comprising *Poa annua* when *Poa annua* is in an early post-emergence growth state. In certain aspects, the contacting may be effective to control or suppress *Poa annua* in the absence of the contacting of the stand of warm season turfgrass comprising *Poa annua* with any other herbicidal active ingredients.

In certain embodiments, the presently disclosed methods may include contacting the stand of warm season turfgrass of *Poa annua* during the months of September, October, or November when the stand of warm season turfgrass is located in the Northern Hemisphere or during the months of March, April, or May when the stand of warm season turfgrass is located in the Southern Hemisphere. In certain cases, the stand of warm season turfgrass may be contacted with no other herbicidal active ingredients effective for the control of *Poa annua* during the months of September, October, or November when the stand of warm season turfgrass is located in the Northern Hemisphere or during the months of March, April, or May when the stand of warm season turfgrass is located in the Southern Hemisphere.

In at least some instances, the presently disclosed methods may include contacting the stand of warm season turfgrass with from about 15 grams (g) thiencarbazone-methyl active ingredient (a.i.) to about 30 g a.i. per hectare of turfgrass. In other instances, the presently disclosed methods may include contacting the stand of warm season turfgrass with thiencarbazone-methyl in a total amount equal to or less than 45 grams (g) thiencarbazone-methyl active ingredient (a.i.) per hectare of turfgrass during the period of time that the *Poa annua* is in an early post-emergence growth state. In some cases, the thiencarbazone-methyl is contacted with the stand of warm season turfgrass in a single application or only once during the period of time that the *Poa annua* is in an early post-emergence growth state.

The warm season turfgrass or stand of warm season turfgrass may be any warm season turfgrass. Examples of warm season turfgrasses may include warm season turfgrasses that may be cultivated, grown, or located in lawns, golf courses, athletic fields, sod farms, parks, cemeteries, non-agricultural fields, plant nurseries, and along roadways. The warm season turfgrass may be geographically located in the grass transition zone or in the warm season grass zone. The warm season turfgrass may be geographically located in the United States or in another country in which warm season turfgrass is grown. In certain embodiments, the warm season turfgrass may be, for example, Hybrid bermudagrass (*C. dactylon* x *C. transvaalensis*), Bermudagrass (*Cynodon* spp. L. C. Rich), zoysiagrass (*Zoysia* spp. Willd.), St. Augustine grass (*Stenotaphrum secundatum* Walt Kuntze), centipedegrass (*Eremochloa ophiuroides* Munro Hack.), or buffalo grass (*Buchloe dactyloids* (Nutt.) Engelm.).

In at least certain embodiments, the contacting may be effective to suppress or control *Poa annua* in the stand of turfgrass when thiencarbazone-methyl is applied in a single application of from about 15 grams (g) thiencarbazone-methyl active ingredient (a.i.) to about 30 g a.i. per hectare of turfgrass. In certain embodiments, the contacting may be effective to suppress or control *Poa annua* in the stand of turfgrass when the total application of thiencarbazone-methyl during the period of time that the *Poa annua* is in an early post-emergence growth state is no greater than 45 g a.i. per hectare of turfgrass. The contacting of the stand of warm season turfgrass with an herbicidally effective amount of thiencarbazone-methyl may result in an 80% or greater reduction in the population of *Poa annua* in the stand of warm season turfgrass when applied to the presently disclosed methods. In particular, the presently disclosed methods may be effective to achieve an Abbott's percentage reduction of 80% for *Poa annua* in the stand of warm season turfgrass.

As used herein, the term "Abbott's percentage reduction," in all of its forms, refers to a measure of percentage control relative to the population in an untreated control stand of turfgrass. Rather than representing a simple percentage control on a per treatment basis, the Abbott's percentage reduction measure accounts for naturally occurring shifts in the target population and limits rating bias over time. Abbott's percentage reduction may be represented by the following formula: Corrected %=(1−(n in treated plot after treatment/n in control plot after treatment))*100.

In certain aspects of the present disclosure, contacting the stand of warm season turfgrass may include applying an herbicidal mixture to the stand of warm season turfgrass comprising *Poa annua*. In certain cases, the herbicidal mixture may include thiencarbazone-methyl, iodosulfuron-methyl-sodium (CAS 144550-36-7), and dicamba (CAS 1918-00-9). In other cases, the herbicidal mixture may include thiencarbazone-methyl, iodosulfuron-methyl-sodium, and halosulfuron-methyl (CAS 100784-20-1). In still other cases, the herbicidal mixture may include thiencarbazone-methyl, foramsulfuron (CAS 173159-57-4), and halosulfuron-methyl.

In at least some instances, the presently disclosed methods may include not contacting the stand of warm season turfgrass with foramsulfuron or not contacting the stand of warm season turfgrass with foramsulfuron during the period of time that the *Poa annua* is in an early post-emergence growth state. The presently disclosed methods may be effective to control or suppress *Poa annua* in the absence of the contacting of the stand of warm season turfgrass comprising *Poa annua* with foramsulfuron or an herbicidal mixture comprising foramsulfuron.

The presently disclosed methods may include mowing the stand of warm season turfgrass or using a mower to cut, crop, or trim the stand of warm season turfgrass. The methods may also include applying the herbicidal composition or the liquid solution comprising thiencarbazone-methyl to the stand of warm season turfgrass within one week or ten days of the stand of warm season turfgrass being mowed.

EXAMPLES

The examples provided below illustrates selected aspects of the presently disclosed methods for controlling *Poa annua* in a stand of warm season turfgrass.

Example 1

Figure 10:
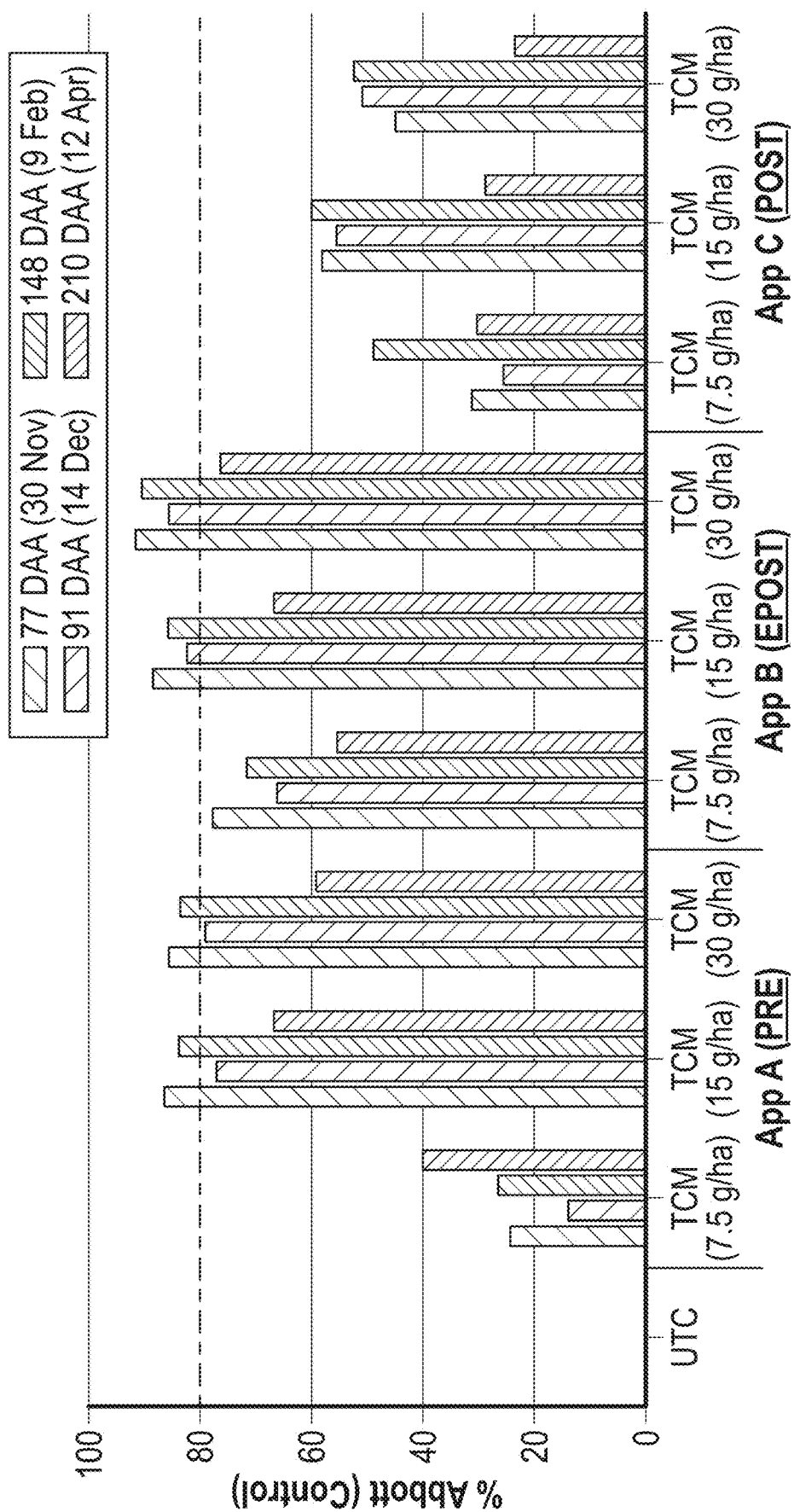
FIG. 10 is a graphical representation of data collected for the treatment of a stand of bermudagrass containing *Poa annua* with thiencarbazone-methyl (TCM) during the autumn of 2022 in Blacksburg, Virginia, according to an exemplary embodiment of the present disclosure.
Figure 12:
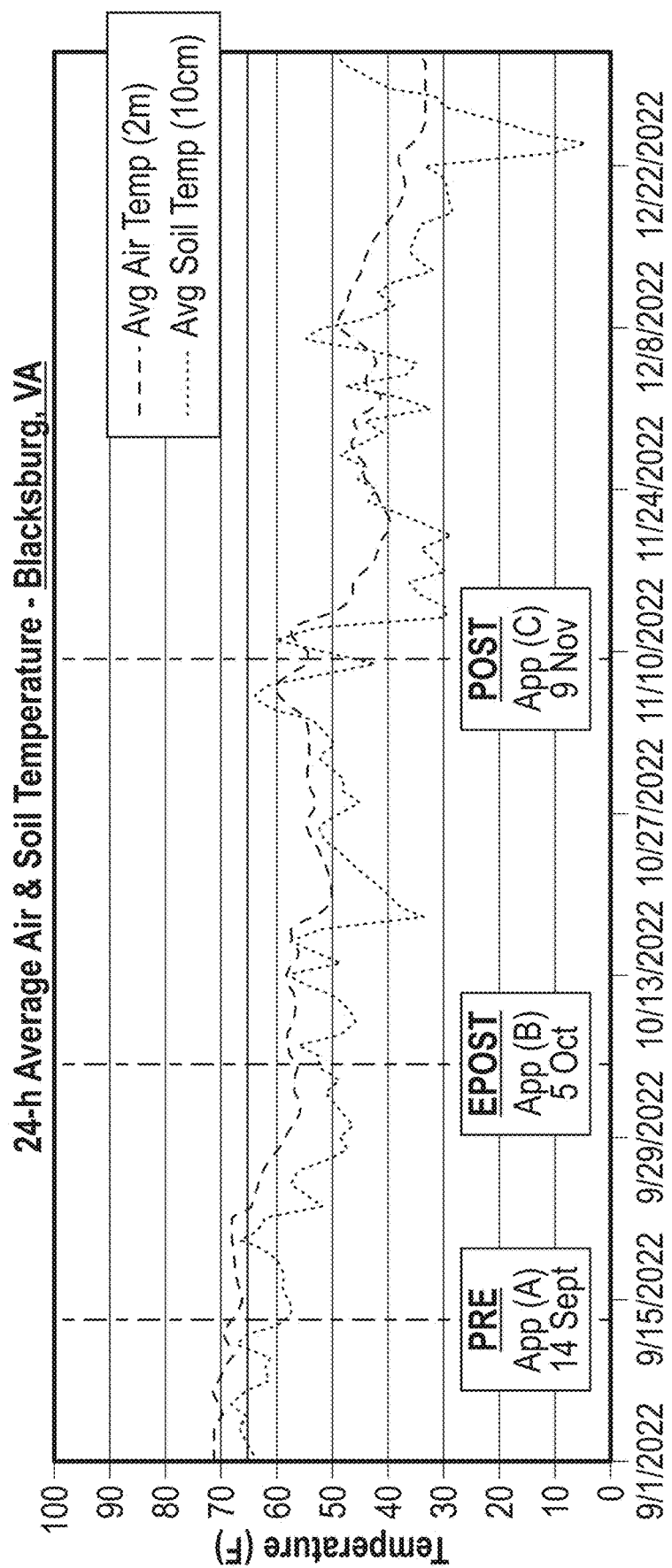
FIG. 12 is a graphical representation of the environmental conditions before, during, and after the treatment of bermudagrass in Blacksburg, Virginia with thiencarbazone-methyl during the autumn of 2022, according to an exemplary embodiment of the present disclosure.

Stands of bermudagrass infested with *Poa annua* were treated with thiencarbazone-methyl (TCM) at different stages of *Poa annua* development and under different climatological conditions in a set of trials conducted during the autumn of 2022 in Blacksburg, Virginia. Stands of bermudagrass containing *Poa annua* in a pre-emergent growth phase were treated with thiencarbazone-methyl (TCM) on September 14$^{th}$. Stands of bermudagrass containing *Poa annua* in an early post-emergent growth state characterized by having two or fewer tillers were treated with thiencarbazone-methyl (TCM) on October 5$^{th}$. Stands of bermudagrass containing *Poa annua* in a late post-emergent growth state characterized by having more than two tillers were treated with thiencarbazone-methyl (TCM) on November 9$^{th}$. The Blacksburg trial data is shown in FIG. 10 while FIG. 12 provides the corresponding environmental data for Blacksburg during the trials. The Days After Application "DAA" shown in FIG. 10 refers to the days after thiencarbazone-methyl (TCM) was applied to the stands of bermudagrass containing *Poa annua* in a pre-emergent growth phase on Sep. 14, 2022. The horizontal line in FIG. 12 represents the temperature (66 degrees Fahrenheit) at which peak *Poa annua* germination has been observed. As shown in FIG. 10, 80% Abbott control threshold effectiveness was achieved by thiencarbazone-methyl treatments at 15 g/ha and 30 g/ha application rates when the *Poa annua* was in an early-post emergent growth phase for 77, 91, and 148 days after the pre-emergence treatment application. However, treatment of bermudagrass stands containing *Poa annua* at a later growth stage fell well below the minimum commercially acceptable 80% Abbott control threshold effectiveness.

Example 2

Figure 11:
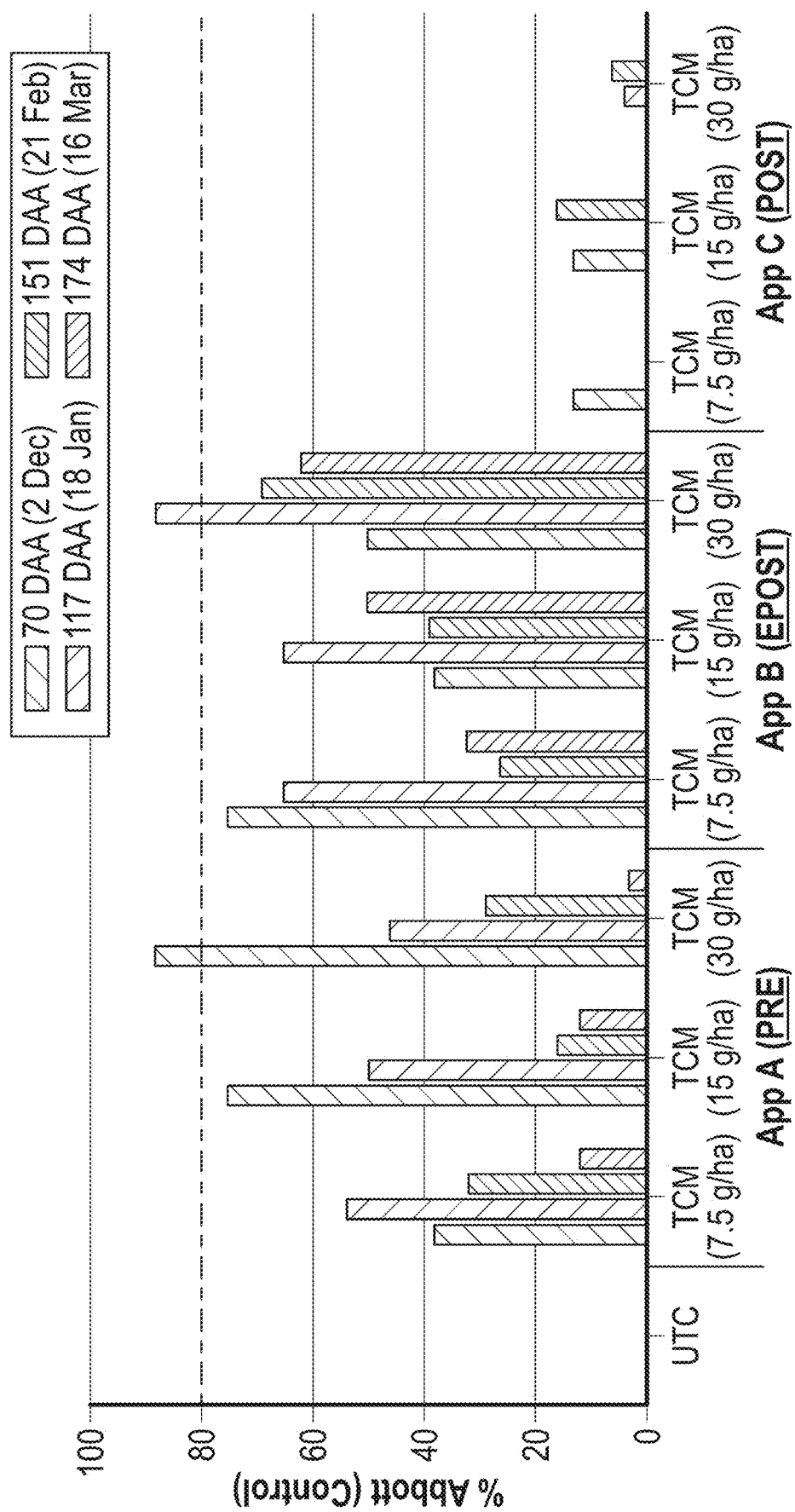
FIG. 11 is a graphical representation of data collected for the treatment of a stand of bermudagrass containing *Poa annua* with thiencarbazone-methyl (TCM) during the autumn of 2022 in Clayton, North Carolina, according to an exemplary embodiment of the present disclosure.
Figure 13:
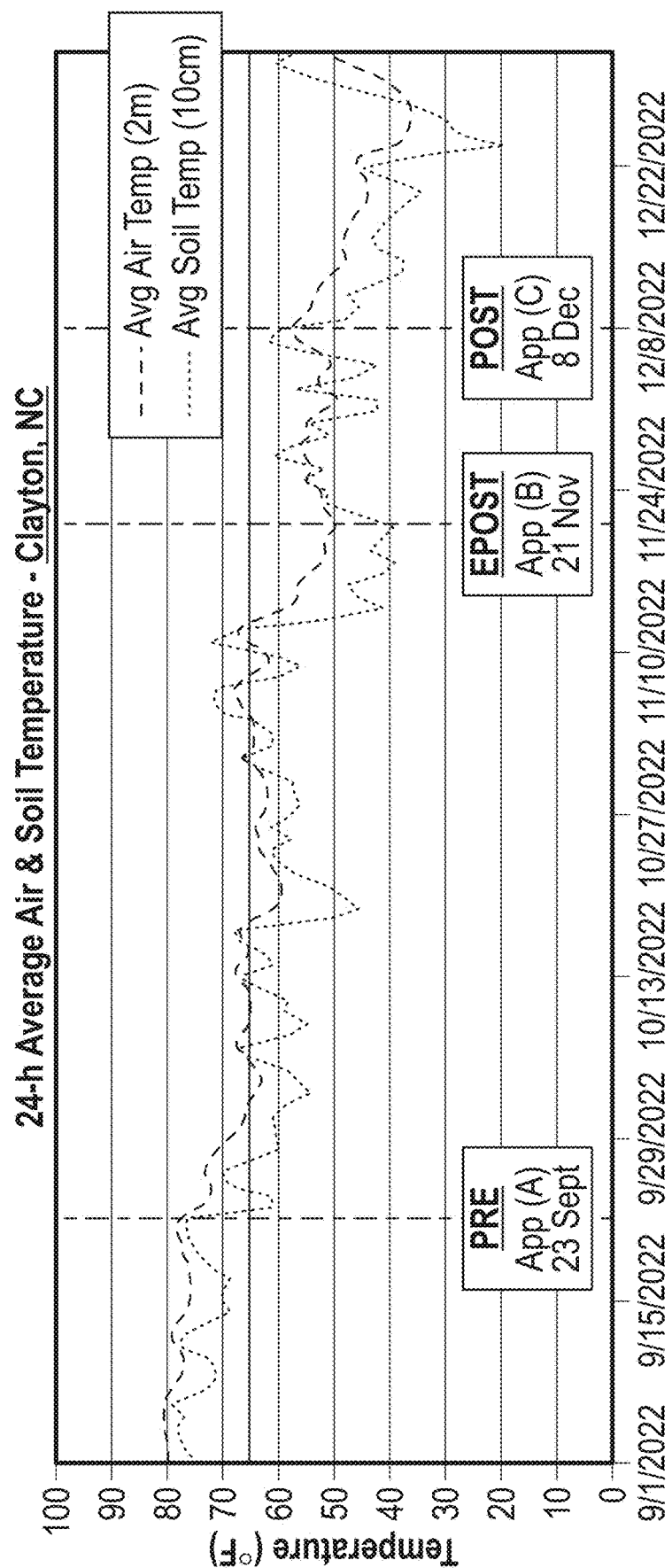
FIG. 13 is a graphical representation of the environmental conditions before, during, and after the treatment of bermudagrass in Clayton, North Carolina with thiencarbazone-methyl during the autumn of 2022, according to an exemplary embodiment of the present disclosure.

Stands of bermudagrass infested with *Poa annua* were treated with thiencarbazone-methyl (TCM) at different stages of *Poa annua* development and under different climatological conditions in a set of trials conducted during the autumn of 2022 in Clayton, North Carolina. Stands of bermudagrass containing *Poa annua* in a pre-emergent growth phase were treated with thiencarbazone-methyl (TCM) on September 23$^{rd}$. Stands of bermudagrass containing *Poa annua* in an early post-emergent growth state characterized by having two or fewer tillers were treated with thiencarbazone-methyl (TCM) on November 21$^{st}$. Stands of bermudagrass containing *Poa annua* in a late post-emergent growth state characterized by having more than two tillers were treated with thiencarbazone-methyl (TCM) on December 8$^{th}$. The Clayton trial data is shown in FIG. 11 while FIG. 13 provides the corresponding environmental data for Clayton during the trials. The Days After Application "DAA" shown in FIG. 11 refers to the days after thiencarbazone-methyl (TCM) was applied to the stands of bermudagrass containing *Poa annua* in a pre-emergent growth phase on Sep. 23, 2022. The horizontal line in FIG. 13 represents the soil temperature (66 degrees Fahrenheit) at which peak *Poa annua* germination has been observed. As shown in FIG. 11, 80% Abbott control threshold effectiveness was achieved by thiencarbazone-methyl treatments at 30 g/ha application rates when the *Poa annua* was in an early-post emergent growth phase for 117 days after the pre-emergence treatment application. However, treatment of bermudagrass stands containing *Poa annua* at a later growth stage fell well below the minimum commercially acceptable 80% Abbott control threshold effectiveness.

Other objects, features and advantages of the disclosure will become apparent from the foregoing figures, detailed description, and examples. It should be understood, however, that the figures, detailed description, and examples, while indicating specific embodiments of the disclosure, are given by way of illustration only and are not meant to be limiting. In further embodiments, features from specific embodiments may be combined with features from other embodiments. For example, features from one embodiment may be combined with features from any of the other embodiments. In further embodiments, additional features may be added to the specific embodiments described herein.

Statements of the Disclosure

Statement 1: A method for controlling and/or suppressing *Poa annua* (annual bluegrass) in a stand of warm season turfgrass, the method comprising: contacting a stand of warm season turfgrass comprising *Poa annua* with an herbicidally effective amount of thiencarbazone-methyl, wherein the contacting occurs when the *Poa annua* is in an early post-emergence growth state.

Statement 2: The method according to Statement 1, wherein the early post-emergence growth state is characterized by the *Poa annua* having two tillers or less.

Statement 3: The method according to Statement 2, wherein the early post-emergence growth state is characterized by substantially all of the *Poa annua* plants in the stand of warm season turfgrass as being characterized as having two tillers or less.

Statement 4: The method according to Statement 1, wherein the early post-emergence growth state is characterized by the *Poa annua* plants lacking inflorescences or being in a pre-inflorescence growth stage.

Statement 5: The method according to Statement 4, wherein the majority of the *Poa annua* plants in the stand of warm season turfgrass are characterized as lacking inflorescences or being in a pre-inflorescence growth stage.

Statement 6: The method according to any one of Statements 1-5, wherein the contacting occurs when the soil temperature below the warm season turfgrass comprising *Poa annua* is below about 18.9 degrees Celsius (66 degrees Fahrenheit).

Statement 7: The method according to any one of Statements 1-5, wherein the contacting occurs when the soil temperature below the warm season turfgrass comprising *Poa annua* is below about 18.4 degrees Celsius (65 degrees Fahrenheit).

Statement 8: The method according to any one of Statements 1-5, wherein the contacting occurs when the soil temperature below the warm season turfgrass comprising *Poa annua* is below about 15.6 degrees Celsius (60 degrees Fahrenheit).

Statement 9: The method according to any one of Statements 1-5, wherein the contacting occurs when the soil temperature below the warm season turfgrass comprising *Poa annua* is from about 10 degrees Celsius (50 degrees Fahrenheit) to about 18.9 degrees Celsius (66 degrees Fahrenheit).

Statement 10: The method according to any one of Statements 1-5, wherein the contacting occurs when the soil temperature below the warm season turfgrass comprising *Poa annua* is from about 10 degrees Celsius (50 degrees Fahrenheit) to about 18.4 degrees Celsius (65 degrees Fahrenheit).

Statement 11: The method according to any one of Statements 1-5, wherein the contacting occurs when the soil temperature below the warm season turfgrass comprising *Poa annua* is from about 10 degrees Celsius (50 degrees Fahrenheit) to about 15.6 degrees Celsius (60 degrees Fahrenheit).

Statement 12: The method according to any one of Statements 1-5, wherein the contacting occurs when the soil temperature below the warm season turfgrass comprising *Poa annua* is from about 10 degrees Celsius (50 degrees Fahrenheit) to about 14.5 degrees Celsius (58 degrees Fahrenheit).

Statement 13: The method according to any one of Statements 1-5, wherein the contacting occurs during the period of time beginning when the soil temperature below the warm season turfgrass first reaches a temperature below about 18.9 degrees Celsius (66 degrees Fahrenheit) following the summer solstice or during the autumn, and ending ten (10) weeks later.

Statement 14: The method according to any one of Statements 1-5, wherein the contacting occurs during the period of time beginning one week and ending ten (10) weeks after the soil temperature below the warm season turfgrass first reaches a temperature below about 18.9 degrees Celsius (66 degrees Fahrenheit) following the summer solstice or during the autumn.

Statement 15: The method according to any one of Statements 1-5, wherein the contacting occurs during the period of time beginning when the average daily soil temperature below the warm season turfgrass first reaches a temperature below about 18.9 degrees Celsius (66 degrees Fahrenheit) following the summer solstice, or during the autumn, and ending ten (10) weeks later, wherein the average daily soil temperature is calculated on a weekly basis.

Statement 16: The method according to any one of Statements 1-5, wherein the contacting occurs during the period of time beginning one (1) week and ending ten (10) weeks after the average daily soil temperature below the warm season turfgrass first reaches a temperature below about 18.9 degrees Celsius (66 degrees Fahrenheit) following the summer solstice, or during the autumn, wherein the average daily soil temperature is calculated on a weekly basis.

Statement 17: The method according to any one of Statements 1-5, wherein the contacting occurs when the average daily soil temperature below the warm season turfgrass comprising *Poa annua* is below about 18.9 degrees Celsius (66 degrees Fahrenheit) for the preceding week prior to contacting.

Statement 18: The method according to any one of Statements 1-5, wherein the contacting occurs when the average daily soil temperature below the warm season turfgrass comprising *Poa annua* is below about 18.9 degrees Celsius (66 degrees Fahrenheit), wherein the average daily soil temperature is calculated on a weekly basis.

Statement 19: The method according to any one of Statements 1-5, wherein the contacting occurs when the average daily soil temperature below the warm season turfgrass comprising *Poa annua* is from about 10 degrees Celsius (50 degrees Fahrenheit) to about 18.9 degrees Celsius (66 degrees Fahrenheit) for the preceding week prior to contacting.

Statement 20: The method according to any one of Statements 1-5, wherein the contacting occurs when the average daily soil temperature below the warm season turfgrass comprising *Poa annua* is from about 10 degrees Celsius (50 degrees Fahrenheit) to about 18.9 degrees Celsius (66 degrees Fahrenheit), wherein the average daily soil temperature is calculated on a weekly basis.

Statement 21: The method according to any one of Statements 1-20, wherein the contacting is restricted to when the *Poa annua* is in an early post-emergence growth state.

Statement 22: The method according to any one of Statements 1-20, wherein the contacting is restricted to when the *Poa annua* has two tillers or less.

Statement 23: The method according to any one of Statements 1-20, wherein the contacting is restricted to when the *Poa annua* plants lack inflorescences or are in a pre-inflorescence growth stage.

Statement 24: The method according to any one of Statements 1-20, wherein the contacting is restricted to when the majority of the *Poa annua* plants in the stand of warm season turfgrass are characterized as having two tillers or less.

Statement 25: The method according to any one of Statements 1-20, wherein the contacting is restricted to when the majority of the *Poa annua* plants in the stand of warm season turfgrass are characterized as lacking inflorescences or being in a pre-inflorescence growth stage.

Statement 26: The method according to any one of Statements 1-5, wherein the contacting is restricted to when the soil temperature below the warm season turfgrass comprising *Poa annua* is below about 18.9 degrees Celsius (66 degrees Fahrenheit).

Statement 27: The method according to any one of Statements 1-5, wherein the contacting is restricted to when the soil temperature below the warm season turfgrass comprising *Poa annua* is below about 18.4 degrees Celsius (65 degrees Fahrenheit).

Statement 28: The method according to any one of Statements 1-5, wherein the contacting is restricted to when the soil temperature below the warm season turfgrass comprising *Poa annua* is below about 15.6 degrees Celsius (60 degrees Fahrenheit).

Statement 29: The method according to any one of Statements 1-5, wherein the contacting is restricted to when the soil temperature below the warm season turfgrass comprising *Poa annua* is from about 10 degrees Celsius (50 degrees Fahrenheit) to about 18.9 degrees Celsius (66 degrees Fahrenheit).

Statement 30: The method according to any one of Statements 1-5, wherein the contacting restricted to when the soil temperature below the warm season turfgrass comprising *Poa annua* is from about 10 degrees Celsius (50 degrees Fahrenheit) to about 18.4 degrees Celsius (65 degrees Fahrenheit).

Statement 31: The method according to any one of Statements 1-5, wherein the contacting is restricted to when the soil temperature below the warm season turfgrass comprising *Poa annua* is from about 10 degrees Celsius (50 degrees Fahrenheit) to about 15.6 degrees Celsius (60 degrees Fahrenheit).

Statement 32: The method according to any one of Statements 1-5, wherein the contacting is restricted to when the soil temperature below the warm season turfgrass comprising *Poa annua* is from about 10 degrees Celsius (50 degrees Fahrenheit) to about 14.5 degrees Celsius (58 degrees Fahrenheit).

Statement 33: The method according to any one of Statements 1-5, wherein the contacting is restricted to the period of time beginning when the soil temperature below the warm season turfgrass first reaches a temperature below about 18.9 degrees Celsius (66 degrees Fahrenheit) following the summer solstice, or during the autumn, and ending ten (10) weeks later.

Statement 34: The method according to any one of Statements 1-5, wherein the contacting is restricted to the period of time beginning one (1) week and ending ten (10) weeks after the soil temperature below the warm season turfgrass first reaches a temperature below about 18.9 degrees Celsius (66 degrees Fahrenheit) following the summer solstice, or during the autumn.

Statement 35: The method according to any one of Statements 1-5, wherein the contacting is restricted to the period of time beginning when the average daily soil temperature below the warm season turfgrass first reaches a temperature below about 18.9 degrees Celsius (66 degrees Fahrenheit) following the summer solstice, or during the autumn, and ending ten (10) weeks later, wherein the average daily soil temperature is calculated on a weekly basis.

Statement 36: The method according to any one of Statements 1-5, wherein the contacting is restricted to the period of time beginning one (1) week and ending ten (10) weeks after the average daily soil temperature below the warm season turfgrass first reaches a temperature below about 18.9 degrees Celsius (66 degrees Fahrenheit) following the summer solstice, or during the autumn, wherein the average daily soil temperature is calculated on a weekly basis.

Statement 37: The method according to any one of Statements 1-5, wherein the contacting is restricted to when the average daily soil temperature below the warm season turfgrass comprising *Poa annua* is below about 18.9 degrees Celsius (66 degrees Fahrenheit) for the preceding week prior to contacting.

Statement 38: The method according to any one of Statements 1-5, wherein the contacting is restricted to when the average daily soil temperature below the warm season turfgrass comprising *Poa annua* is below about 18.9 degrees Celsius (66 degrees Fahrenheit), wherein the average daily soil temperature is calculated on a weekly basis.

Statement 39: The method according to any one of Statements 1-5, wherein the contacting is restricted to when the average daily soil temperature below the warm season turfgrass comprising *Poa annua* is from about 10 degrees Celsius (50 degrees Fahrenheit) to about 18.9 degrees Celsius (66 degrees Fahrenheit) for the preceding week prior to contacting.

Statement 40: The method according to any one of Statements 1-5, wherein the contacting is restricted to when the average daily soil temperature below the warm season turfgrass comprising *Poa annua* is from about 10 degrees Celsius (50 degrees Fahrenheit) to about 18.9 degrees Celsius (66 degrees Fahrenheit), wherein the average daily soil temperature is calculated on a weekly basis.

Statement 41: The method according to any one of Statements 6-20 and 26-40, wherein the soil temperature is measured at about 5 centimeters depth below the stand of warm season turfgrass.

Statement 42: The method according to any one of Statements 1-41, wherein the contacting occurs when the temperature of the air surrounding the warm season turfgrass comprising *Poa annua* is below about 18.4 degrees Celsius (65 degrees Fahrenheit).

Statement 43: The method according to any one of Statements 1-41, wherein the contacting occurs when the temperature of the air surrounding the warm season turfgrass comprising *Poa annua* is below about 15.6 degrees Celsius (60 degrees Fahrenheit).

Statement 44: The method according to any one of Statements 1-41, wherein the contacting occurs when the temperature of the air surrounding the warm season turfgrass comprising *Poa annua* is below about 12.8 degrees Celsius (55 degrees Fahrenheit).

Statement 45: The method according to any one of Statements 1-41, wherein the contacting occurs when the air temperature surrounding the warm season turfgrass comprising *Poa annua* is from about 0 degrees Celsius (32 degrees Fahrenheit) to about 18.4 degrees Celsius (65 degrees Fahrenheit).

Statement 46: The method according to any one of Statements 1-41, wherein the contacting occurs when the air temperature surrounding the warm season turfgrass comprising *Poa annua* is from about 4.5 degrees Celsius (40 degrees Fahrenheit) to about 18.4 degrees Celsius (65 degrees Fahrenheit).

Statement 47: The method according to any one of Statements 1-41, wherein the contacting occurs when the air temperature surrounding the warm season turfgrass comprising *Poa annua* is from about 1.7 degrees Celsius (35 degrees Fahrenheit) to about 18.4 degrees Celsius (65 degrees Fahrenheit).

Statement 48: The method according to any one of Statements 1-41, wherein the contacting occurs when the air temperature surrounding the warm season turfgrass comprising *Poa annua* is from about 1.7 degrees Celsius (35 degrees Fahrenheit) to about 15.6 degrees Celsius (60 degrees Fahrenheit).

Statement 49: The method according to any one of Statements 1-41, wherein the contacting occurs during the period of time beginning when the air temperature surrounding the warm season turfgrass first reaches a temperature below about 18.4 degrees Celsius (65 degrees Fahrenheit) following the summer solstice, or during the autumn, and ending ten (10) weeks later.

Statement 50: The method according to any one of Statements 1-41, wherein the contacting occurs during the period of time beginning one (1) week and ending ten (10) weeks after the air temperature surrounding the warm season turfgrass first reaches a temperature below about 18.4 degrees Celsius (65 degrees Fahrenheit) following the summer solstice, or during the autumn.

Statement 51: The method according to any one of Statements 1-5, wherein the contacting occurs during the period of time beginning when the average daily air temperature surrounding the warm season turfgrass first reaches a temperature below about 18.4 degrees Celsius (65 degrees Fahrenheit) following the summer solstice, or during the autumn, and ending ten (10) weeks later, wherein the average daily air temperature is calculated on a weekly basis.

Statement 52: The method according to any one of Statements 1-5, wherein the contacting occurs during the period of time beginning one (1) week and ending ten (10) weeks after the average daily air temperature surrounding the warm season turfgrass first reaches a temperature below about 18.4 degrees Celsius (65 degrees Fahrenheit) following the summer solstice, or during the autumn, wherein the average daily air temperature is calculated on a weekly basis.

Statement 53: The method according to any one of Statements 1-41, wherein the contacting occurs when the average daily air temperature surrounding the warm season turfgrass comprising *Poa annua* is below about 18.4 degrees Celsius (65 degrees Fahrenheit) for the preceding week prior to contacting.

Statement 54: The method according to any one of Statements 1-41, wherein the contacting occurs when the average daily air temperature surrounding the warm season turfgrass comprising *Poa annua* is below about 18.4 degrees Celsius (65 degrees Fahrenheit), wherein the average daily air temperature is calculated on a weekly basis.

Statement 55: The method according to any one of Statements 1-41, wherein the contacting occurs when the average daily air temperature surrounding the warm season turfgrass comprising *Poa annua* is from about 0 degrees Celsius (32 degrees Fahrenheit) to about 18.4 degrees Celsius (65 degrees Fahrenheit) for the preceding week prior to contacting.

Statement 56: The method according to any one of Statements 1-41, wherein the contacting occurs when the average daily air temperature surrounding the warm season turfgrass comprising *Poa annua* is from about 0 degrees Celsius (32 degrees Fahrenheit) to about 18.4 degrees Celsius (65 degrees Fahrenheit), wherein the average daily air temperature is calculated on a weekly basis.

Statement 57: The method according to any one of Statements 1-41, wherein the contacting is restricted to when the air temperature surrounding the warm season turfgrass comprising *Poa annua* is below about 18.4 degrees Celsius (65 degrees Fahrenheit).

Statement 58: The method according to any one of Statements 1-41, wherein the contacting is restricted to when the air temperature surrounding the warm season turfgrass comprising *Poa annua* is below about 15.6 degrees Celsius (60 degrees Fahrenheit).

Statement 59: The method according to any one of Statements 1-41, wherein the contacting is restricted to when the air temperature surrounding the warm season turfgrass comprising *Poa annua* is below about 12.8 degrees Celsius (55 degrees Fahrenheit).

Statement 60: The method according to any one of Statements 1-41, wherein the contacting is restricted to when the air temperature surrounding the warm season turfgrass comprising *Poa annua* is from about 0 degrees Celsius (32 degrees Fahrenheit) to about 18.4 degrees Celsius (65 degrees Fahrenheit).

Statement 61: The method according to any one of Statements 1-41, wherein the contacting is restricted to when the air temperature surrounding the warm season turfgrass comprising *Poa annua* is from about 1.7 degrees Celsius (35 degrees Fahrenheit) to about 18.4 degrees Celsius (65 degrees Fahrenheit).

Statement 62: The method according to any one of Statements 1-41, wherein the contacting is restricted to when the air temperature surrounding the warm season turfgrass comprising *Poa annua* is from about 4.5 degrees Celsius (40 degrees Fahrenheit) to about 18.4 degrees Celsius (65 degrees Fahrenheit).

Statement 63: The method according to any one of Statements 1-41, wherein the contacting is restricted to when the air temperature surrounding the warm season turfgrass comprising *Poa annua* is from about 1.7 degrees Celsius (35 degrees Fahrenheit) to about 15.6 degrees Celsius (60 degrees Fahrenheit).

Statement 64: The method according to any one of Statements 1-41, wherein the contacting is restricted to the period of time beginning when the air temperature surrounding the warm season turfgrass first reaches a temperature below about 18.4 degrees Celsius (65 degrees Fahrenheit) following the summer solstice, or during the autumn, and ending ten (10) weeks later.

Statement 65: The method according to any one of Statements 1-41, wherein the contacting is restricted to the period of time beginning one (1) week and ending ten (10) weeks after the air temperature surrounding the warm season turfgrass first reaches a temperature below about 18.4 degrees Celsius (65 degrees Fahrenheit) following the summer solstice or during the autumn.

Statement 66: The method according to any one of Statements 1-41, wherein the contacting is restricted to the period of time beginning when the average daily air temperature surrounding the warm season turfgrass first reaches a temperature below about 18.4 degrees Celsius (65 degrees Fahrenheit) following the summer solstice, or during the autumn, and ending ten (10) weeks later, wherein the average daily air temperature is calculated on a weekly basis.

Statement 67: The method according to any one of Statements 1-41, wherein the contacting is restricted to the period of time beginning one (1) week and ending ten (10) weeks after the average daily air temperature surrounding the warm season turfgrass first reaches a temperature below about 18.4 degrees Celsius (65 degrees Fahrenheit) following the summer solstice, or during the autumn, wherein the average daily air temperature is calculated on a weekly basis.

Statement 68: The method according to any one of Statements 1-41, wherein the contacting is restricted to when the average daily air temperature surrounding the warm season turfgrass comprising *Poa annua* is below about 18.4 degrees Celsius (66 degrees Fahrenheit) for the preceding week prior to contacting.

Statement 69: The method according to any one of Statements 1-41, wherein the contacting is restricted to when the average daily air temperature surrounding the warm season turfgrass comprising *Poa annua* is below about 18.4 degrees Celsius (65 degrees Fahrenheit), wherein the average daily air temperature is calculated on a weekly basis.

Statement 70: The method according to any one of Statements 1-41, wherein the contacting is restricted to when the average daily air temperature surrounding the warm season turfgrass comprising *Poa annua* is from about 0 degrees Celsius (32 degrees Fahrenheit) to about 18.4 degrees Celsius (65 degrees Fahrenheit) for preceding week prior to contacting.

Statement 71: The method according to any one of Statements 1-41, wherein the contacting is restricted to when the average daily air temperature surrounding the warm season turfgrass comprising *Poa annua* is from about 0 degrees Celsius (32 degrees Fahrenheit) to about 18.4 degrees Celsius (65 degrees Fahrenheit), wherein the average daily air temperature is calculated on a weekly basis.

Statement 72: The method according to any one of Statements 42-71, wherein the air temperature is measured at about 2 meters above the stand of warm season turfgrass.

Statement 73: The method according to any one of Statements 42-71, wherein the air temperature is based on meteorological observations or forecasts for the geographic area in which warm season turfgrass stand is located.

Statement 74: The method according to any one of Statements 1-73, wherein the contacting occurs during the period of time beginning when the new emergence of one or more *Poa annua* plants is first detected in the stand of warm season turfgrass during the autumn or following the summer solstice, and ending ten (10) weeks later.

Statement 75: The method according to any one of Statements 1-73, wherein the contacting is restricted to the period of time beginning when the new emergence of one or more *Poa annua* plants is first detected in the stand of warm season turfgrass during the autumn or following the summer solstice, and ending ten (10) weeks later.

Statement 76: The method according to any one of Statements 1-75, wherein the contacting occurs in the absence of contacting the stand of warm season turfgrass comprising *Poa annua* with any other herbicidal active ingredient.

Statement 77: The method according to any one of Statements 1-75, wherein the contacting occurs in the absence of contacting the stand of warm season turfgrass comprising *Poa annua* with any other herbicidal active ingredient effective for the control or suppression of *Poa annua*.

Statement 78: The method according to any one of Statements 1-75, wherein no other herbicidal active ingredients are contacted with the stand of warm season turfgrass comprising *Poa annua* when *Poa annua* is in an early post-emergence growth state.

Statement 79: The method according to any one of Statements 1-75, wherein no other herbicidal active ingredients effective for the control or suppression of *Poa annua* are contacted with the stand of warm season turfgrass comprising *Poa annua* when *Poa annua* is in an early post-emergence growth state.

Statement 80: The method according to any one of Statements 1-79, wherein the contacting is effective to control or suppress *Poa annua* in the absence of the contacting of the stand of warm season turfgrass comprising *Poa annua* with any other herbicidal active ingredients.

Statement 81: The method according to any one of Statements 1-80, wherein the stand of warm season turfgrass is geographically located in the grass transition zone.

Statement 82: The method according to any one of Statements 1-80, wherein the stand of warm season turfgrass is geographically located in the warm season grass zone.

Statement 83: The method according to any one of Statements 1-82, wherein the stand of warm season turfgrass is geographically located in the United States.

Statement 84: The method according to any one of Statements 1-83, wherein the contacting occurs during the months of September, October, or November when the stand of warm season turfgrass is located in the Northern Hemisphere or during the months of March, April, or May when the stand of warm season turfgrass is located in the Southern Hemisphere.

Statement 85: The method according to Statement 84, wherein the stand of warm season turfgrass is contacted with no other herbicidal active ingredients effective for the control of *Poa annua* during the months of September, October, or November when the stand of warm season turfgrass is located in the Northern Hemisphere or during the months of March, April, or May when the stand of warm season turfgrass is located in the Southern Hemisphere.

Statement 86: The method according to any one of Statements 1-85, wherein the contacting comprises contacting the stand of warm season turfgrass with from about 15 grams (g) thiencarbazone-methyl active ingredient (a.i.) to about 30 g a.i. per hectare of turfgrass.

Statement 87: The method according to any one of Statements 1-85, wherein the contacting comprises contacting the stand of warm season turfgrass with thiencarbazone-methyl in a total amount equal to or less than 45 grams (g) thiencarbazone-methyl active ingredient (a.i.) per hectare of turfgrass during the period of time that the *Poa annua* is in an early post-emergence growth state.

Statement 88: The method according to Statement 87, wherein the period of time is during the months of September, October, and November when the stand of warm season turfgrass is located in the Northern Hemisphere or during the months of March, April, or May when the stand of warm season turfgrass is located in the Southern Hemisphere.

Statement 89: The method according to any one of Statements 86-88, wherein the thiencarbazone-methyl is contacted with the stand of warm season turfgrass in a single application.

Statement 90: The method according to any one of Statements 1-85, wherein the contacting is effective to suppress or control *Poa annua* in the stand of turfgrass when thiencarbazone-methyl is applied in a single application of from about 15 grams (g) thiencarbazone-methyl active ingredient (a.i.) to about 30 g a.i. per hectare of turfgrass.

Statement 91: The method according to any one of Statements 1-90, wherein the contacting is effective to suppress or control *Poa annua* in the stand of turfgrass when the total application of thiencarbazone-methyl during the period of time that the *Poa annua* is in an early post-emergence growth state is no greater than 45 g a.i. per hectare of turfgrass.

Statement 92: The method according to Statement 91, wherein the period of time is during the months of September, October, and November when the stand of warm season turfgrass is located in the Northern Hemisphere or during the months of March, April, or May when the stand of warm season turfgrass is located in the Southern Hemisphere.

Statement 93: The method according to any one of Statements 1-92, wherein the warm season turfgrass is selected from the group consisting of Hybrid bermudagrass (*C. dactylon* x *C. transvaalensis*), Bermudagrass (*Cynodon* spp. L. C. Rich), zoysiagrass (*Zoysia* spp. Willd.), St. Augustine grass (*Stenotaphrum secundatum* Walt Kuntze), centipedegrass (*Eremochloa ophiuroides* Munro Hack.), and buffalo grass (*Buchloe dactyloids* (Nutt.) Engelm.).

Statement 94: The method according to any one of Statements 1-93, wherein the contacting comprises applying a herbicidal mixture to the stand of warm season turfgrass comprising *Poa annua*, the herbicidal mixture comprising thiencarbazone-methyl, iodosulfuron-methyl-sodium, and dicamba.

Statement 95: The method according to any one of Statements 1-28, wherein the contacting comprises applying a herbicidal mixture to the stand of warm season turfgrass comprising *Poa annua*, the herbicidal mixture comprising thiencarbazone-methyl, iodosulfuron-methyl-sodium, and halosulfuron-methyl.

Statement 96: The method according to any one of Statements 1-95, wherein foramsulfuron is not contacted with the warm season turfgrass comprising *Poa annua*.

Statement 97: The method according to any one of Statements 1-95, wherein foramsulfuron is not contacted with the warm season turfgrass comprising *Poa annua* during the period of time that the *Poa annua* is in an early post-emergence growth state.

Statement 98: The method according to Statement 97, wherein the period of time is during the months of September, October, and November when the stand of warm season turfgrass is located in the Northern Hemisphere or during the months of March, April, and May when the stand of warm season turfgrass is located in the Southern Hemisphere.

Statement 99: The method according to any one of Statements 1-98, wherein the contacting is effective to control or suppress *Poa annua* in the absence of the contacting of the stand of warm season turfgrass comprising *Poa annua* with foramsulfuron or an herbicidal mixture comprising foramsulfuron.

Statement 100: The method according to any one of Statements 1-93, wherein the contacting comprises applying a herbicidal mixture to the stand of warm season turfgrass comprising *Poa annua*, the herbicidal mixture comprising thiencarbazone-methyl, foramsulfuron, and halosulfuron-methyl.

Statement 101: The method according to any one of Statements 1-100, wherein the contacting is effective to achieve an Abbott's percentage reduction of at least 80% for *Poa annua* in the stand of warm season turfgrass.

Statement 102: The method according to any one of Statements 1-101, wherein the stand of warm season turfgrass is located in a turfgrass growing environment selected from the group consisting of lawns, golf courses, athletic fields, sod farms, parks, cemeteries, non-agricultural fields, plant nurseries, and adjacent to roadways.

Statement 103: The method according to any one of Statements 1-102, wherein the contacting results in an 80% or greater reduction in the population of *Poa annua* in the stand of warm season turfgrass.

Statement 104: The method according to any one of Statements 1-103, further comprising applying one or more compositions comprising an herbicidally effective amount of thiencarbazone-methyl to the stand of warm season turfgrass such that *Poa annua* is contacted by an herbicidally effective amount of thiencarbazone-methyl.

Statement 105: The method according to Statement 104, where in the applying comprises a single post-emergent application of a compositions comprising an herbicidally effective amount of thiencarbazone-methyl.

Statement 106: The method according to any one of Statements 1-103, further comprising causing the application of an herbicidal composition comprising an herbicidally effective amount of thiencarbazone-methyl to the stand of warm season turfgrass such that *Poa annua* is contacted by an herbicidally effective amount of thiencarbazone-methyl.

Statement 107: The method according to Statement 106, where in the applying comprises a single post-emergent application of an herbicidal composition comprising an herbicidally effective amount of thiencarbazone-methyl.

Statement 108: The method according to Statement 106, wherein the application of the herbicidal composition to the stand of warm season turfgrass is restricted to one application per year.

Statement 109: The method according to Statement 106, wherein the application of the herbicidal composition to the stand of warm season turfgrass is restricted to one application per growing season.

Statement 110: The method according to Statement 104, further comprising: applying the herbicidal composition to the stand of warm season turfgrass once per year.

Statement 111: The method according to Statement 104, further comprising: applying the herbicidal composition to the stand of warm season turfgrass once per growing season.

Statement 112: The method according to any one of Statements 1-111, wherein contacting comprises applying a liquid solution comprising an herbicidal composition comprising an herbicidally effective amount of thiencarbazone-methyl to the *Poa annua* or the stand of warm season turfgrass such that the *Poa annua* is contacted by the herbicidal composition.

Statement 113: The method according to any one of Statements 1-112, further comprising: spraying an herbicidally effective amount of an herbicidal composition or liquid solution comprising thiencarbazone-methyl onto the *Poa annua* or the stand of warm season turfgrass such that the *Poa annua* is contacted by the herbicidal composition or liquid solution.

Statement 114: The method according to any one of Statements 1-113, further comprising: mowing the stand of warm season turfgrass.

Statement 115: The method according to any one of Statements 1-114, further comprising: using a mower to cut, crop, or trim the stand of warm season turfgrass.

Statement 116: The method according to Statement 114 or Statement 115, further comprising: applying the herbicidal composition or the liquid solution comprising thiencarbazone-methyl to the stand of warm season turfgrass within one week of the stand of warm season turfgrass being mowed.

Statement 117: The method according to any one of Statements 1-116, further comprising: applying an herbicidal composition or a liquid solution comprising thiencarbazone-methyl directly to the *Poa annua* in the stand of warm season turfgrass as a spot spray.

Statement 118: The method according to Statement 117, wherein the applying occurs within ten days of the of the stand of warm season turfgrass being mowed.

Statement 119: The method according to any one of Statements 1-118, wherein the stand of warm season turfgrass is a managed or manicured stand of warm season turfgrass located in an environment selected from the group consisting of lawns, golf courses, athletic fields, sod farms, parks, and cemeteries.

Statement 120: The method according to any one of Statements 1-119, further comprising: causing the application of an herbicidally effective amount of thiencarbazone-methyl to a stand of warm season turfgrass comprising *Poa annua*.

Statement 121: The method according to any one of Statements 1-120, wherein the method is a method for treating an infestation of *Poa annua* in a stand of warm season turfgrass.

Statement 122: The method according to any one of Statements 1-121, further comprising: determining whether one or more new *Poa annua* plants have emerged in the stand of warm season turfgrass following the summer solstice or during the autumn; determining whether a majority of the one or more new *Poa annua* plants are characterized as having two tillers or less; and contacting the stand of warm season turfgrass comprising *Poa annua* with an herbicidally effective amount of thiencarbazone-methyl, wherein the contacting occurs when a majority of the *Poa annua* plants in the stand of warm season turfgrass are characterized as having two tillers or less.

Statement 123: The method according to Statement 122, wherein the contacting is restricted to when a majority of the *Poa annua* plants in the stand of warm season turfgrass are characterized as having two tillers or less.

Statement 124: The method according to Statement 123, wherein the contacting comprises a single post-emergent application of thiencarbazone-methyl to the *Poa annua* during the period of time that the *Poa annua* plants in the stand of warm season turfgrass are characterized as having two tillers or less.

Statement 125: The method according to any one of Statements 1-121, further comprising: determining whether one or more new *Poa annua* plants have emerged in the stand of warm season turfgrass following the summer solstice or during the autumn; determining whether a majority of the one or more newly emerged *Poa annua* plants are characterized as lacking inflorescences or being in a pre-inflorescence growth stage; contacting a stand of warm season turfgrass comprising *Poa annua* with an herbicidally effective amount of thiencarbazone-methyl, wherein the contacting occurs when a majority of the *Poa annua* plants in the stand of warm season turfgrass are characterized as lacking inflorescences or being in a pre-inflorescence growth stage.

Statement 126: The method according to Statement 125, wherein the contacting is restricted to when a majority of the *Poa annua* plants in the stand of warm season turfgrass are characterized as lacking inflorescences or being in a pre-inflorescence growth stage.

Statement 127: The method according to Statement 125 or Statement 126, wherein the contacting comprises a single post-emergent application of thiencarbazone-methyl to the *Poa annua* during the period of time that the *Poa annua* plants in the stand of warm season turfgrass are characterized as lacking inflorescences or being in a pre-inflorescence growth stage.

Statement 128: The method according to any one of Statements 1-127, further comprising: determining when the soil temperature below the warm season turfgrass first reaches a temperature below about 18.9 degrees Celsius (66 degrees Fahrenheit) following the summer solstice or during the autumn, wherein the soil temperature is determined by measuring the soil temperature at a depth of five (5) centimeters (cm) below the soil surface; and contacting a stand of warm season turfgrass comprising *Poa annua* with an herbicidally effective amount of thiencarbazone-methyl, wherein the contacting occurs during the period of time beginning when the soil temperature below the warm season turfgrass first reaches a temperature below about 18.9 degrees Celsius (66 degrees Fahrenheit) following the summer solstice or during the autumn, and ending ten (10) weeks later.

Statement 129: The method according to Statement 128, further comprising: monitoring the soil temperature below the warm season turfgrass to determine when the soil temperature below the warm season turfgrass first reaches a temperature below about 18.9 degrees Celsius (66 degrees Fahrenheit) following the summer solstice or during the autumn.

Statement 130: The method according to Statement 128 or Statement 129, wherein the contacting is restricted to during the period of time beginning when the soil temperature below the warm season turfgrass first reaches a temperature below about 18.9 degrees Celsius (66 degrees Fahrenheit) following the summer solstice or during the autumn, and ending ten (10) weeks later.

Statement 131: The method according to any of Statements 128-130, wherein the contacting comprises a single post-emergent application of thiencarbazone-methyl to the *Poa annua* during the period of time beginning when the soil temperature below the warm season turfgrass first reaches a temperature below about 18.9 degrees Celsius (66 degrees Fahrenheit) following the summer solstice or during the autumn, and ending ten (10) weeks later.

Statement 132: The method according to any one of Statements 1-127, further comprising: determining when the average daily soil temperature below the warm season turfgrass first reaches a temperature below about 18.9 degrees Celsius (66 degrees Fahrenheit) following the summer solstice, or during the autumn, wherein the average daily soil temperature is calculated on a weekly basis, and wherein the soil temperature is determined by measuring the soil temperature at a depth of five (5) centimeters (cm) below the soil surface; and contacting a stand of warm season turfgrass comprising *Poa annua* with an herbicidally effective amount of thiencarbazone-methyl, wherein the contacting occurs during the period of time beginning when the soil temperature below the warm season turfgrass first reaches a temperature below about 18.9 degrees Celsius (66 degrees Fahrenheit) following the summer solstice or during the autumn, and ending ten (10) weeks later.

Statement 133: The method according to any one of Statements 1-127, further comprising: determining when the average daily soil temperature below the warm season turfgrass first reaches a temperature below about 18.9 degrees Celsius (66 degrees Fahrenheit) following the summer solstice, or during the autumn, wherein the average daily soil temperature is calculated on a weekly basis, and wherein the soil temperature is determined by measuring the soil temperature at a depth of five (5) centimeters (cm) below the soil surface; and contacting a stand of warm season turfgrass comprising *Poa annua* with an herbicidally effective amount of thiencarbazone-methyl, wherein the contacting is restricted to the period of time beginning when the soil temperature below the warm season turfgrass first reaches a temperature below about 18.9 degrees Celsius (66 degrees Fahrenheit) following the summer solstice or during the autumn, and ending ten (10) weeks later.

Statement 134: The method according to Statement 132 or Statement 133, further comprising: monitoring the soil temperature below the warm season turfgrass to determine when the soil temperature below the warm season turfgrass first reaches a temperature below about 18.9 degrees Celsius (66 degrees Fahrenheit) following the summer solstice or during the autumn.

Statement 135: The method according to any one of Statements 1-127, further comprising: determining when the average daily soil temperature below the warm season turfgrass is below about 18.9 degrees Celsius (66 degrees Fahrenheit) following the summer solstice, or during the autumn, wherein the average daily soil temperature is calculated on a weekly basis, and wherein the soil temperature is determined by measuring the soil temperature at a depth of five (5) centimeters (cm) below the soil surface; contacting a stand of warm season turfgrass comprising *Poa annua* with an herbicidally effective amount of thiencarbazone-methyl, wherein the contacting is restricted to when the average daily soil temperature below the warm season turfgrass is first below about 18.9 degrees Celsius (66 degrees Fahrenheit) for the preceding week following the summer solstice, or during the autumn.

Statement 136: The method according to any one of Statements 1-127, further comprising: determining when the average daily soil temperature below the warm season turfgrass is from about 10 degrees Celsius (50 degrees Fahrenheit) to about 18.9 degrees Celsius (66 degrees Fahrenheit) for the preceding week prior to contacting, wherein the average daily soil temperature is calculated on a weekly basis, and wherein the soil temperature is determined by measuring the soil temperature at a depth of five (5) centimeters (cm) below the soil surface; and contacting a stand of warm season turfgrass comprising Poa annua with an herbicidally effective amount of thiencarbazone-methyl, wherein the contacting is restricted to when the soil temperature below the warm season turfgrass is from about 10 degrees Celsius (50 degrees Fahrenheit) to about 18.9 degrees Celsius (66 degrees Fahrenheit) for the preceding week prior to contacting.

Statement 137: The method according to any one of Statements 1-127, further comprising: determining when the average daily air temperature surrounding the warm season turfgrass first reaches a temperature below about 18.4 degrees Celsius (65 degrees Fahrenheit) following the summer solstice, or during the autumn, wherein the average daily air temperature is calculated on a weekly basis, and wherein the air temperature is determined based on a measurement of the air substantially proximal to the stand of warm season turfgrass at about two (2) meters above the stand of warm season turfgrass, or based on meteorological observations or forecasts for the geographic area in which warm season turfgrass stand is located; and contacting a stand of warm season turfgrass comprising Poa annua with an herbicidally effective amount of thiencarbazone-methyl, wherein the contacting is restricted to the period of time when the average daily air temperature surrounding the warm season turfgrass first reaches a temperature below about 18.4 degrees Celsius (65 degrees Fahrenheit) following the summer solstice, or during the autumn, and ending ten (10) weeks later.

Statement 138: A method for controlling Poa annua in a stand of warm season turfgrass, the method comprising: contacting a stand of warm season turfgrass comprising Poa annua with an herbicidally effective amount of thiencarbazone-methyl, wherein the contacting occurs during an early post-emergence period for Poa annua.

Statement 139: The method according to Statement 138, wherein the contacting is restricted to the early post-emergence period.

Statement 140: The method according to Statement 138 or Statement 139, wherein the contacting comprises contacting the stand of warm season turfgrass, and/or the Poa annua therein, with a single application of thiencarbazone-methyl applied during the early post-emergence period, the single application effective to achieve an Abbott's percentage reduction of at least 80% for Poa annua in the stand of warm season turfgrass in the absence of an application during the early post-emergence period of any other herbicidal active ingredient effective for the control of Poa annua in warm season turfgrass.

Statement 141: The method according to any one of Statements 138-140, wherein the early post emergence period comprises the period of time beginning when the seven day mean soil temperature below the warm season turfgrass first falls below about 18.9 degrees Celsius (66 degrees Fahrenheit) following the summer solstice, or during the autumn, and ending ten (10) weeks later.

Statement 142: The method according to any one of Statements 138-141, wherein the early post emergence period comprises the period of time beginning when the seven day mean air temperature surrounding the warm season turfgrass first reaches a temperature below about 18.4 degrees Celsius (65 degrees Fahrenheit) following the summer solstice, or during the autumn, and ending ten (10) weeks later, wherein the seven day mean air temperature is determined based on a measurement of the air temperature substantially proximal to the stand of warm season turfgrass or based on meteorological observations or forecasts for the geographic area in which warm season turfgrass stand is located.

Statement 143: The method according to any one of Statements 138-142, wherein the early post emergence period comprises the period of time beginning when the new emergence of one or more Poa annua plants is predicted to occur based on the monitoring of seven day mean soil temperature or seven day mean air temperature proximal to the stand of warm season turfgrass during the autumn or following the summer solstice, and ending ten (10) weeks later.

Statement 144: The method according to any one of Statements 138-143, further comprising: determining when the seven day mean soil temperature below the warm season turfgrass first falls below about 18.9 degrees Celsius (66 degrees Fahrenheit) following the summer solstice, or during the autumn; and contacting a stand of warm season turfgrass comprising Poa annua with an herbicidally effective amount of thiencarbazone-methyl, wherein the contacting occurs during the period of time beginning when the seven day mean soil temperature below the warm season turfgrass first falls below about 18.9 degrees Celsius (66 degrees Fahrenheit) following the summer solstice or during the autumn, and ending ten (10) weeks later.

Statement 145: The method according to any one of Statements 138-144, further comprising monitoring the daily soil temperature below the warm season turfgrass; determining, based on the daily soil temperature monitoring, a seven day mean soil temperature; determining, based on the seven day mean soil temperature, when the seven day mean soil temperature below the warm season turfgrass first falls below about 18.9 degrees Celsius (66 degrees Fahrenheit) following the summer solstice, or during the autumn; and contacting a stand of warm season turfgrass comprising Poa annua with an herbicidally effective amount of thiencarbazone-methyl, wherein the contacting occurs during the period of time beginning when the seven day mean soil temperature below the warm season turfgrass first falls below about 18.9 degrees Celsius (66 degrees Fahrenheit) following the summer solstice or during the autumn, and ending ten (10) weeks later.

Statement 146: The method according to any one of Statements 138-140, further comprising: monitoring the daily soil temperature below the warm season turfgrass; determining, based on the daily soil temperature monitoring, a seven day mean soil temperature; determining, based on the seven day mean soil temperature, when the seven day mean soil temperature below the warm season turfgrass first falls below about 18.9 degrees Celsius (66 degrees Fahrenheit) following the summer solstice, or during the autumn; and contacting a stand of warm season turfgrass comprising Poa annua with an herbicidally effective amount of thiencarbazone-methyl, wherein the contacting occurs during the period of time beginning when the seven day mean soil temperature below the warm season turfgrass first falls below about 18.9 degrees Celsius (66 degrees Fahrenheit) following the summer solstice or during the autumn, and ending ten (10) weeks later.

Statement 147: The method according to Statement 146, wherein the contacting occurs after the seven day mean soil temperature below the warm season turfgrass first falls below about 18.9 degrees Celsius (66 degrees Fahrenheit) following the summer solstice or during the autumn, and before the emergence of one or more *Poa annua* plants is visually observable above a turfgrass canopy in the stand of the turfgrass.

Statement 148: The method according to any one of Statements 138-140, further comprising: monitoring the daily soil temperature below the warm season turfgrass; determining, based on the daily soil temperature monitoring, a seven day mean soil temperature; predicting, based on the seven day mean soil temperature, the time of first emergence of *Poa annua* in the stand of warm season turfgrass following the summer solstice, or during the autumn, wherein the time of first emergence is prior to when the emergence of one or more *Poa annua* plants is visually observable above a turfgrass canopy in the stand of the turfgrass; and contacting the stand of warm season turfgrass comprising *Poa annua* with an herbicidally effective amount of thiencarbazone-methyl, wherein the contacting occurs during the period of time beginning at the predicted time of first emergence of *Poa annua* and ending ten (10) weeks later.

Statement 149: The method according to Statement 148, wherein the contacting occurs after the predicted time of first emergence of *Poa annua* and before the emergence of one or more *Poa annua* plants is visually observable above a turfgrass canopy in the stand of the turfgrass.

Statement 150: The method according to any one of Statements 138-140, further comprising: monitoring one or more of the daily soil temperature below the stand of warm season turfgrass and the daily air temperature surrounding the stand of warm season turfgrass; determining, based on the daily soil temperature monitoring, one or more of a seven day mean soil temperature and a seven day mean air temperature; predicting, based on the one or more of a seven day mean soil temperature and a seven day mean air temperature, a time period of *Poa annua* susceptibility to the application of thiencarbazone methyl, wherein time period of *Poa annua* susceptibility comprises a period of time when the emergence of one or more *Poa annua* plants above a turfgrass canopy in the stand of the turfgrass is not yet visually observable; contacting the stand of warm season turfgrass comprising *Poa annua* with an herbicidally effective amount of thiencarbazone-methyl, wherein the contacting occurs during the time period of *Poa annua* susceptibility.

Statement 151: The method according to Statement 150, wherein the contacting occurs during a portion of the time period of *Poa annua* susceptibility in which the emergence of one or more *Poa annua* plants above a turfgrass canopy in the stand of the turfgrass is not yet visually observable.

Statement 152: The method according to any one of Statements 138-140, further comprising: determining when the seven day mean air temperature surrounding the warm season turfgrass first falls below about 18.4 degrees Celsius (65 degrees Fahrenheit) following the summer solstice, or during the autumn wherein the air temperature is determined based on a measurement of the air substantially proximal to the stand of warm season turfgrass or based on meteorological observations or forecasts for the geographic area in which warm season turfgrass stand is located; and contacting a stand of warm season turfgrass comprising *Poa annua* with an herbicidally effective amount of thiencarbazone-methyl, wherein the contacting occurs during the period of time when the seven day mean air temperature surrounding the warm season turfgrass first falls below about 18.4 degrees Celsius (65 degrees Fahrenheit) following the summer solstice, or during the autumn, and ending ten (10) weeks later.

Statement 153: The method according to any one of Statements 138-140, further comprising: monitoring the daily air temperature surrounding the warm season turfgrass; determining, based on the daily air temperature monitoring, a seven day mean air temperature; determining, based on the seven day mean air temperature, when the seven day mean air temperature first falls below about 18.4 degrees Celsius (65 degrees Fahrenheit) following the summer solstice, or during the autumn; and contacting a stand of warm season turfgrass comprising *Poa annua* with an herbicidally effective amount of thiencarbazone-methyl, wherein the contacting occurs during the period of time beginning when the seven day mean air temperature surrounding the warm season turfgrass first falls below about 18.4 degrees Celsius (65 degrees Fahrenheit) following the summer solstice or during the autumn, and ending ten (10) weeks later.

Statement 154: The method according to any one of Statements 138-140, further comprising: monitoring the daily air temperature surrounding the warm season turfgrass; determining, based on the daily air temperature monitoring, a seven day mean air temperature; predicting, based on the seven day mean air temperature, the time of first emergence of *Poa annua* in the stand of warm season turfgrass following the summer solstice, or during the autumn, wherein the time of first emergence is prior to when the emergence of one or more *Poa annua* plants is visually observable above a turfgrass canopy in the stand of the turfgrass; contacting the stand of warm season turfgrass comprising *Poa annua* with an herbicidally effective amount of thiencarbazone-methyl, wherein the contacting occurs during the period of time beginning at the predicted time of first emergence of *Poa annua* and ending ten (10) weeks later.

Statement 155: The method according to Statement 154, wherein the contacting occurs after the predicted time of first emergence of *Poa annua* and before the emergence of one or more *Poa annua* plants is visually observable above a turfgrass canopy in the stand of the turfgrass.

Statement 156: The method according to any one of Statements 138-140, further comprising: monitoring one or more of the daily soil temperature below the stand of warm season turfgrass and the daily air temperature surrounding the stand of warm season turfgrass; determining, based on the daily soil temperature monitoring, one or more of a seven day mean soil temperature and a seven day mean air temperature; predicting, based on the one or more of a seven day mean soil temperature and a seven day mean air temperature, a time period of *Poa annua* susceptibility to the application of thiencarbazone methyl, wherein time period of *Poa annua* susceptibility comprises a period of time when the emergence of one or more *Poa annua* plants above a turfgrass canopy in the stand of the turfgrass is not yet visually observable; contacting the stand of warm season turfgrass comprising *Poa annua* with an herbicidally effective amount of thiencarbazone-methyl, wherein the contacting occurs during the time period of *Poa annua* susceptibility.

Statement 157: The method according to Statement 156, wherein the contacting occurs during a portion of the time period of *Poa annua* susceptibility in which the emergence of one or more *Poa annua* plants above a turfgrass canopy in the stand of the turfgrass is not yet visually observable.

Statement 158: The method according to any one of Statements 138-157, wherein contacting comprises applying a liquid solution comprising an herbicidal composition comprising an herbicidally effective amount of thiencarbazone-methyl to the *Poa annua* or the stand of warm season turfgrass such that the *Poa annua* is contacted by the herbicidal composition.

Statement 159: The method according to any one of Statements 138-158, wherein the herbicidal composition comprises an herbicidal mixture, the herbicidal mixture comprising thiencarbazone-methyl, iodosulfuron-methyl-sodium, and dicamba.

Statement 160: The method according to any one of Statements 138-159, wherein the contacting comprises one of: (a) contacting the stand of warm season turfgrass with a single post-emergent application comprising from about 15 grams (g) thiencarbazone-methyl active ingredient (a.i.) to about 30 g a.i. per hectare of turfgrass; and (b) contacting the stand of warm season turfgrass with thiencarbazone-methyl in a total amount equal to or less than 45 grams (g) thiencarbazone-methyl active ingredient (a.i.) per hectare of turfgrass during the early post-emergence period.

Statement 161: The method according to any one of Statements 138-160, wherein the warm season turfgrass is selected from the group consisting of Hybrid bermudagrass (*C. dactylon* x *C. transvaalensis*), Bermudagrass (*Cynodon* spp. L. C. Rich), zoysiagrass (*Zoysia* spp. Willd.), St. Augustine grass (*Stenotaphrum secundatum* Walt Kuntze), centipedegrass (*Eremochloa ophiuroides* Munro Hack.), and buffalo grass (*Buchloe dactyloids* (Nutt.) Engelm.).

What is claimed is:

1. A method for controlling *Poa annua* in a stand of warm season turf grass, the method comprising:
   contacting a stand of warm season turf grass comprising *Poa annua* with an herbicidally effective amount of thiencarbazone-methyl, wherein the contacting occurs during an early post-emergence period for *Poa annua*,
   wherein the early post-emergence period comprises the period of time beginning when new emergence of one or more *Poa annua* plants is first detected during the autumn or following the summer solstice and ending up to ten (10) weeks later, and
   wherein the amount of thiencarbazone-methyl comprises from about 15 grams (g) thiencarbazone-methyl active ingredient (a.i.) to about 30 g a.i. per hectare of turf grass.

2. The method according to claim 1, wherein the early post-emergence period comprises the period of time beginning when new emergence of one or more *Poa annua* plants is first detected during the autumn or following the summer solstice and ending eight (8) weeks later, and wherein the contacting is restricted to the early post-emergence period.

3. The method according to claim 1, wherein the early post-emergence period comprises the period of time in which at least 80% of the *Poa annua* plants in the stand of warm season turfgrass are characterized as having two or fewer tillers, and wherein the contacting comprises contacting the stand of warm season turfgrass, and/or the *Poa annua* therein, with a single application of thiencarbazone-methyl applied during the early post-emergence period, the single application effective to achieve an Abbott's percentage reduction of at least 80% for *Poa annua* in the stand of warm season turfgrass in the absence of an application during the early post-emergence period of any other herbicidal active ingredient effective for the control of *Poa annua* in warm season turfgrass.

4. The method according to claim 1, wherein the early post emergence period comprises the period of time beginning when the seven day mean soil temperature below the warm season turfgrass first falls below about 15.6 degrees Celsius following the summer solstice, or during the autumn, and ending five (5) weeks later.

5. The method according to claim 1, wherein the early post-emergence period comprises the period of time beginning when the seven day mean air temperature surrounding the warm season turfgrass first reaches a temperature below about 18.4 degrees Celsius following the summer solstice, or during the autumn, and ending ten (10) weeks later, wherein the seven day mean air temperature is determined based on a measurement of the air temperature proximal to the stand of warm season turf grass or based on meteorological observations or forecasts for the geographic area in which warm season turfgrass stand is located.

6. The method according to claim 1, wherein the early post-emergence period comprises the period of time beginning when the new emergence of one or more *Poa annua* plants is predicted to occur based on the monitoring of seven day mean soil temperature or seven day mean air temperature proximal to the stand of warm season turf grass during the autumn or following the summer solstice, and ending five (5) weeks later, and wherein the contacting occurs before the one or more *Poa annua* plants is visually observable above a turfgrass canopy in the stand of turfgrass.

7. The method according to claim 1, further comprising:
   determining when the seven day mean soil temperature below the warm season turfgrass first falls below about 18.9 degrees Celsius following the summer solstice, or during the autumn; and
   contacting a stand of warm season turf grass comprising *Poa annua* with an herbicidally effective amount of thiencarbazone-methyl, wherein the contacting occurs during the period of time beginning when the seven day mean soil temperature below the warm season turf grass first falls below about 18.9 degrees Celsius following the summer solstice or during the autumn, and ending ten (10) weeks later.

8. The method according to claim 1, further comprising:
   monitoring the daily soil temperature below the warm season turfgrass;
   determining, based on the daily soil temperature monitoring, a seven day mean soil temperature;
   determining, based on the seven day mean soil temperature, when the seven day mean soil temperature below the warm season turfgrass first falls below about 18.9 degrees Celsius following the summer solstice, or during the autumn;
   contacting a stand of warm season turf grass comprising *Poa annua* with an herbicidally effective amount of thiencarbazone-methyl, wherein the contacting occurs during the period of time beginning when the seven day mean soil temperature below the warm season turf grass first falls below about 18.9 degrees Celsius following the summer solstice or during the autumn, and ending ten (10) weeks later.

9. The method according to claim 8, wherein the contacting occurs after the seven day mean soil temperature below the warm season turfgrass first falls below about 18.9 degrees Celsius following the summer solstice or during the autumn, and before the emergence of one or more *Poa*

*annua* plants is visually observable above a turf grass canopy in the stand of the turf grass.

10. The method according to claim 1, further comprising:
monitoring the daily soil temperature below the warm season turfgrass;
determining, based on the daily soil temperature monitoring, a seven day mean soil temperature;
predicting, based on the seven day mean soil temperature, the time of first emergence of *Poa annua* in the stand of warm season turf grass following the summer solstice, or during the autumn, wherein the time of first emergence is prior to when the emergence of one or more *Poa annua* plants is visually observable above a turf grass canopy in the stand of the turf grass;
contacting the stand of warm season turf grass comprising *Poa annua* with an herbicidally effective amount of thiencarbazone-methyl, wherein the contacting occurs during the period of time beginning at the predicted time of first emergence of *Poa annua* and ending ten (10) weeks later.

11. The method according to claim 10, wherein the contacting occurs after the predicted time of first emergence of *Poa annua* and before the emergence of one or more *Poa annua* plants is visually observable above a turf grass canopy in the stand of the turf grass.

12. The method according to claim 1, further comprising:
monitoring one or more of the daily soil temperature below the stand of warm season turfgrass and the daily air temperature surrounding the stand of warm season turf grass;
determining, based on the one or more of the daily soil temperature monitoring and daily air temperature monitoring, one or more of a seven day mean soil temperature and a seven day mean air temperature;
predicting, based on the one or more of a seven day mean soil temperature and a seven day mean air temperature, a time period of *Poa annua* susceptibility to the application of thiencarbazone methyl, wherein time period of *Poa annua* susceptibility comprises a period of time when the emergence of one or more *Poa annua* plants above a turfgrass canopy in the stand of the turf grass is not yet visually observable;
contacting the stand of warm season turf grass comprising *Poa annua* with an herbicidally effective amount of thiencarbazone-methyl, wherein the contacting occurs during the time period of *Poa annua* susceptibility.

13. The method according to claim 12, wherein the contacting occurs during a portion of the time period of *Poa annua* susceptibility in which the emergence of one or more *Poa annua* plants above a turf grass canopy in the stand of the turf grass is not yet visually observable.

14. The method according to claim 1, further comprising:
determining when the seven day mean air temperature surrounding the warm season turfgrass first falls below about 18.4 degrees Celsius following the summer solstice, or during the autumn wherein the air temperature is determined based on a measurement of the air substantially proximal to the stand of warm season turf grass or based on meteorological observations or forecasts for the geographic area in which warm season turfgrass stand is located; and
contacting a stand of warm season turf grass comprising *Poa annua* with an herbicidally effective amount of thiencarbazone-methyl, wherein the contacting occurs during the period of time when the seven day mean air temperature surrounding the warm season turfgrass first falls below about 18.4 degrees Celsius following the summer solstice, or during the autumn, and ending ten (10) weeks later.

15. The method according to claim 1, further comprising:
monitoring the daily air temperature surrounding the warm season turfgrass;
determining, based on the daily air temperature monitoring, a seven day mean air temperature;
determining, based on the seven day mean air temperature, when the seven day mean air temperature first falls below about 18.4 degrees Celsius following the summer solstice, or during the autumn;
contacting a stand of warm season turf grass comprising *Poa annua* with an herbicidally effective amount of thiencarbazone-methyl, wherein the contacting occurs during the period of time beginning when the seven day mean air temperature surrounding the warm season turf grass first falls below about 18.4 degrees Celsius following the summer solstice or during the autumn, and ending ten (10) weeks later.

16. The method according to claim 1, further comprising:
monitoring the daily air temperature surrounding the warm season turf grass;
determining, based on the daily air temperature monitoring, a seven day mean air temperature;
predicting, based on the seven day mean air temperature, the time of first emergence of *Poa annua* in the stand of warm season turf grass following the summer solstice, or during the autumn, wherein the time of first emergence is prior to when the emergence of one or more *Poa annua* plants is visually observable above a turf grass canopy in the stand of the turf grass;
contacting the stand of warm season turf grass comprising *Poa annua* with an herbicidally effective amount of thiencarbazone-methyl, wherein the contacting occurs during the period of time beginning at the predicted time of first emergence of *Poa annua* and ending ten (10) weeks later.

17. The method according to claim 1, wherein contacting comprises applying a liquid solution comprising an herbicidal composition comprising an herbicidally effective amount of thiencarbazone-methyl to the *Poa annua* or the stand of warm season turf grass such that the *Poa annua* is contacted by the herbicidal composition.

18. The method according to claim 17, wherein the herbicidal composition comprises an herbicidal mixture, the herbicidal mixture comprising thiencarbazone-methyl, iodosulfuronmethyl-sodium, and dicamba.

19. The method according to claim 1, wherein the contacting comprises one of:
(a) contacting the stand of warm season turfgrass with a single post-emergent application comprising from about 15 grams (g) thiencarbazone-methyl active ingredient (a.i.) to about 30 g a.i. per hectare of turf grass; and
(b) contacting the stand of warm season turfgrass with thiencarbazone-methyl in a total amount equal to or less than 45 grams (g) thiencarbazone-methyl active ingredient (a.i.) per hectare of turf grass during the early post-emergence period.

20. The method according to claim 1, wherein the warm season turfgrass is selected from the group consisting of Hybrid bermudagrass, Bermudagrass (*Cynodon* spp. L. C. Rich), zoysiagrass (*Zoysia* spp. Willd.), St. Augustine grass (*Stenotaphrum secundatum* Walt Kuntze), centipedegrass (*Eremochloa ophiuroides* Munro Hack.), and buffalo grass (*Buchloe dactyloids* (Nutt.) Engelm.).

\* \* \* \* \*